US012713399B2

(12) United States Patent
Li et al.

(10) Patent No.: US 12,713,399 B2
(45) Date of Patent: Aug. 18, 2026

(54) PAGING METHOD AND APPARATUS

(71) Applicant: HUAWEI TECHNOLOGIES CO., LTD., Shenzhen (CN)

(72) Inventors: Cheng Li, Shanghai (CN); Xin Gao, Beijing (CN); Yi Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 239 days.

(21) Appl. No.: 18/479,772

(22) Filed: Oct. 2, 2023

(65) Prior Publication Data

US 2024/0031989 A1 Jan. 25, 2024

Related U.S. Application Data

(63) Continuation of application No. PCT/CN2022/082578, filed on Mar. 23, 2022.

(30) Foreign Application Priority Data

Mar. 31, 2021 (CN) ......................... 202110349273.7

(51) Int. Cl.
*H04W 68/02* (2009.01)
*H04L 5/00* (2006.01)
*H04W 64/00* (2009.01)

(52) U.S. Cl.
CPC ........... *H04W 68/02* (2013.01); *H04L 5/0048* (2013.01); *H04W 64/003* (2013.01)

(58) Field of Classification Search
CPC ... H04W 68/02; H04W 64/003; H04W 88/18; H04W 4/02; H04W 4/021; H04L 5/0048
See application file for complete search history.

(56) References Cited

U.S. PATENT DOCUMENTS

2013/0095862 A1* 4/2013 Bejerano ............... H04W 68/02 455/458
2014/0024378 A1* 1/2014 Khude .................... H04W 8/06 455/437
2014/0302880 A1* 10/2014 Godin ................... H04W 68/02 455/458
2015/0289229 A1* 10/2015 Ahluwalia ............ H04W 68/04 455/458
2022/0116902 A1* 4/2022 Liu ....................... H04W 4/029
2023/0300942 A1* 9/2023 Quan .................... H04W 76/30 370/329

* cited by examiner

*Primary Examiner* — Moo Jeong
*Assistant Examiner* — David Zhijun Sun

(57) ABSTRACT

Embodiments of this application provide a paging method and an apparatus, to reduce paging overheads, and relate to the field of wireless communication technologies. In the method, a serving network device may receive positioning area information. A positioning area represented by the positioning area information herein is used by a terminal device to send an SRS in an inactive mode or an idle mode. The serving network device may send a paging message to one or more neighboring network devices in a paging area. The paging area may be determined based on the positioning area.

20 Claims, 4 Drawing Sheets

PAGING METHOD AND APPARATUS

CROSS-REFERENCE TO RELATED APPLICATIONS

This application is a continuation of International Application No. PCT/CN2022/082578, filed on Mar. 23, 2022, which claims priority to Chinese Patent Application No. 202110349273.7, filed on Mar. 31, 2021. The disclosures of the aforementioned applications are hereby incorporated by reference in their entireties.

TECHNICAL FIELD

This application relates to the field of wireless communication technologies, and in particular, to a paging method and an apparatus.

BACKGROUND

In a new radio (NR) network, when a terminal device switches from a radio resource control (RRC) connected mode (RRC_CONNECTED) to an RRC inactive mode (RRC_INACTIVE), a serving base station configures a radio access network notification area (RNA) for the terminal device. The terminal device may move freely in the RNA area without notifying the serving base station. When moving out of the RNA area, the terminal device initiates an RNA update procedure. When the terminal device is in the RRC inactive mode and there is data to be sent to the terminal device in a network, the base station initiates a paging procedure in the RNA area, that is, each base station in the RNA area sends a paging signal. After receiving the paging signal, the terminal device may re-initiate random access, apply to establish an RRC connection to the network, and switch from the RRC_INACTIVE mode to the RRC_CONNECTED mode.

In the 5G NR network, the RNA area is configured by the serving base station. However, due to a security problem, in the 5G NR network, the serving base station cannot obtain accurate location information of the terminal device, and the RNA area configured by the serving base station for the terminal device is usually large, which may cause high paging overheads.

SUMMARY

This application provides a paging method, to reduce paging overhead.

According to a first aspect, a paging method is provided. The method may be performed by a network device or a chip having a function similar to that of a network device. In the method, a serving network device may receive positioning area information. A positioning area represented by the positioning area information herein is used by a terminal device to send a sounding reference signal (SRS) in an inactive mode or an idle mode. The serving network device may send a paging message to one or more neighboring network devices in a paging area. The paging area may be determined based on the positioning area.

Based on the solution, a serving base station may determine the paging area based on the positioning area, and the paging area may be a large range in the positioning area, to implement an optimal paging area configuration method, so that some unnecessary network devices can be reduced from participating in paging, to reduce resource overheads of the network device.

In a possible implementation, the serving network device may receive first information from a location server. The first information herein may be an occupation status of each of one or more first SRS resources in a plurality of cells in the positioning area. The occupation status may be occupied, or the occupation status may be not occupied. The first information may be used to determine the paging area. The paging area is a first cell set of a plurality of cells in the positioning area. A quantity of cells in which one or more second SRS resources are occupied in the plurality of cells included in the first cell set may be less than or equal to a first threshold. The one or more second SRS resources may be a part or all of the one or more first SRS resources. It should be understood that the plurality of cells in the positioning area may be some or all of all cells in the positioning area. Similarly, the plurality of cells in the paging area may be some or all of all cells in the paging area. Optionally, the plurality of cells in the paging area may be a set of cells in which the one or more second SRS resources are not occupied in the positioning area.

Based on the solution, the serving network device may interact with the location server, to determine the occupation status of the SRS resource on a neighboring network device, and determine the paging area based on the occupation status of the SRS resource on the neighboring network device, so that a range of the paging area meets, as much as possible, a requirement that the terminal device can be paged in the inactive mode or the idle mode, and the range of the paging area is less than a current RNA area, to reduce paging overheads.

In a possible implementation, the serving network device may send the one or more first SRS resources to the location server. The one or more first SRS resources may be SRS resources to be configured by the serving network device for the terminal device.

Based on the solution, the serving network device may send the SRS resource to be configured for the terminal device to the location server, and the location server determines, in a neighboring cell, an occupation status of the SRS resource to be configured for the terminal device, so that the serving network device may determine, based on the occupation status of the SRS resource, a paging area that can meet a requirement that the terminal device can be paged in the inactive mode or the idle mode.

In a possible implementation, the serving network device may receive one or more third SRS resources from one or more neighboring network devices located in the positioning area. The one or more third SRS resources may not be occupied. The one or more third SRS resources may be used to determine the paging area. The paging area is a second cell set of a plurality of cells in the positioning area. A quantity of cells in which one or more fourth SRS resources are occupied in the plurality of cells included in the second cell set may be less than or equal to a second threshold. The one or more fourth SRS resources may be a part or all of the one or more third SRS resources. Optionally, the plurality of cells in the paging area may be a set of cells in which the one or more fourth SRS resources are not occupied in the positioning area.

Based on the solution, a first network device may determine an occupation status of the SRS resource in a neighboring cell through a location server, and then may determine, based on the occupation status of the SRS resource in the neighboring cell, a paging area that can meet a requirement that the terminal device can be paged in the inactive mode or the idle mode, and a range of the paging area is less than a current RNA area, to reduce paging overheads.

In a possible implementation, the serving network device may send one or more fifth SRS resources to the one or more neighboring network devices located in the positioning area. The one or more fifth SRS resources herein may be SRS resources to be configured by the serving network device for the terminal device. The one or more third SRS resources may be a part or all of the one or more fifth SRS resources.

Based on the solution, the serving network device may perform signaling interaction with the neighboring network device, to determine an occupation status, in the neighboring cell, of the SRS resource to be configured for the terminal device.

In a possible implementation, the serving network device may send a first request message to the one or more neighboring network devices located in the positioning area. The first request message may be used to request an unoccupied SRS resource, and/or used to request an occupied SRS resource.

Based on the solution, the serving network device may request an occupation status of the SRS resource from the neighboring network device by using the first request message, and then the serving network device may determine a paging area based on the occupation status of the SRS resource in the neighboring cell.

In a possible implementation, the serving network device may send a sixth SRS resource to one or more neighboring network devices located in the positioning area. The sixth SRS resource herein may be a resource to be configured by the serving network device for the terminal device. The serving network device may receive a first message from the one or more neighboring network devices. The first message may indicate that the sixth SRS resource is occupied or not occupied. The first message may be used to determine the paging area. The paging area is a third cell set of a plurality of cells in the positioning area. A quantity of cells in which the sixth SRS resource is occupied in the plurality of cells included in the third cell set may be less than or equal to the third threshold. Optionally, the plurality of cells in the paging area may be a set of cells in which the sixth SRS resource is not occupied in the positioning area.

Based on the solution, the serving network device may perform signaling interaction with the neighboring network device, to determine an occupation status, in a neighboring cell, of the SRS resource to be configured for the terminal device, and then may determine a paging area based on the occupation status, in the neighboring cell, of the SRS resource to be configured for the terminal device.

In a possible implementation, the paging area may be the same as the positioning area, or the paging area may be a part of the positioning area.

Based on the solution, the serving base station may determine the paging area by using the positioning area, and then may select an appropriate paging area, so that the terminal device can be paged in the inactive mode or the idle mode, and a range of the paging area is less than a current RNA area, to reduce paging overheads.

In a possible implementation, the serving network device receives information about the terminal device from a core network device. The information about the terminal device from the core network device may be used to trigger the serving network device to send the paging message. The serving network device may send a second message to the terminal device. The second message may be used to release the terminal device to the inactive mode or the idle mode. The second message may include information about the paging area. The serving network device may receive the information about the terminal device from the core network device, and the serving network device may send a paging signal.

Based on the solution, after determining the paging area of the terminal device, the serving network device releases the terminal device to the inactive mode or the idle mode when the terminal device does not transmit data, and sends the paging signal when needing to perform data transmission with the terminal device.

According to a second aspect, a paging method is provided. The method may be performed by a network device or a chip having a function similar to that of a network device. In the method, a neighboring network device may receive a paging message from a serving network device. The paging message may include paging area information. A paging area represented by the paging area information may be determined based on a positioning area. The neighboring network device may send a paging signal.

Based on the solution, the paging area may be a large range in the positioning area, to implement an optimal paging area configuration method, so that some unnecessary network devices can be reduced from participating in paging, to reduce resource overheads of the network device.

In a possible implementation, the neighboring network device may send one or more first SRS resources to a location server. The one or more first SRS resources are not occupied.

Based on the solution, the neighboring network device may report the one or more unoccupied SRS resources on the neighboring network device to the location server, so that the location server may send the one or more SRS resources to the serving network device, and the serving network device determines a paging area based on the one or more SRS resources.

In a possible implementation, the neighboring network device may receive one or more second SRS resources from the location server. The one or more second SRS resources herein may be SRS resources to be configured by the serving network device for a terminal device. The one or more first SRS resources may be a part or all of the one or more second SRS resources.

Based on the solution, the neighboring network device may report an occupation status of the SRS resource to be configured for the terminal device to the location server.

In a possible implementation, the neighboring network device may receive a first request message from the location server. The first request message is used to request an occupied SRS resource, and/or used to request an unoccupied SRS resource.

Based on the solution, the neighboring network device may report an occupation status of the SRS resource in a neighboring cell to the location server based on the first request message.

In a possible implementation, the neighboring network device may receive a third SRS resource from the serving network device. The third SRS resource herein may be a resource to be configured by the serving network device for a terminal device. The neighboring network device may send a first message to the serving network device. The first message herein may indicate that the third SRS resource is not occupied.

Based on the solution, the neighboring network device may report whether an SRS resource is occupied to a location server.

In a possible implementation, the neighboring network device may send one or more fourth SRS resources to the serving network device. The one or more fourth SRS resources herein are not occupied.

Based on the solution, the neighboring network device may report the unoccupied SRS resource to the serving network device, so that the serving network device may determine a paging area based on the unoccupied SRS resource.

In a possible implementation, the neighboring network device may receive one or more fifth SRS resources from the serving network device. The one or more fifth SRS resources herein may be SRS resources to be configured by the serving network device for a terminal device. The one or more fourth SRS resources are a part or all of the one or more fifth SRS resources.

Based on the solution, the neighboring network device may report an occupation status, in a neighboring cell, of the SRS resource to be configured for the terminal device to the serving network device, so that the serving network device may determine a paging area based on the occupation status.

In a possible implementation, the neighboring network device may receive a second request message from the serving network device. The second request message may be used to request an occupied SRS resource, and/or used to request an unoccupied SRS resource.

Based on the solution, the neighboring network device may report the occupation status of the SRS resource in the neighboring cell to the serving network device, so that the serving network device may determine a paging area based on the occupation status of the SRS resource in the neighboring cell.

According to a third aspect, a paging method is provided. The method may be performed by a location server or a chip having a function similar to that of a location server. The location server may include a location management function network element. In the method, the location server may receive an occupation status of each of one or more first SRS resources from one or more neighboring network devices in a positioning area. The occupation status may be occupied, or the occupation status may be not occupied. The location server may send first information to a serving network device based on the occupation status of each of the one or more first SRS resources from the one or more neighboring network devices in the positioning area. The first information indicates the occupation status of each of the one or more first SRS resources in each of a plurality of cells in the positioning area, and the first information may be used to determine a paging area.

Based on the solution, the location server may exchange information with the neighboring network device, to determine the occupation status of the SRS resource on the neighboring network device, and send the occupation status to the serving network device, so that the serving network device may determine a paging area based on the occupation status.

In a possible implementation, the location server may receive one or more second SRS resources from the serving network device. The one or more second SRS resources herein may be resources to be configured by the serving network device for a terminal device. The one or more first SRS resources may be a part or all of the one or more second SRS resources. The location server may send the one or more second SRS resources to the one or more neighboring network devices in the positioning area.

Based on the solution, the location server may request an occupation status of the SRS resource to be configured by the serving network device for the terminal device from the neighboring network device, so that the serving network device may determine a paging area based on the SRS resource to be configured for the terminal device.

In a possible implementation, the location server may send a first request message to the one or more neighboring network devices in the positioning area. The first request message is used to request an occupied SRS resource, and/or used to request an unoccupied SRS resource.

Based on the solution, the location server may request the occupation status of the SRS resource in a neighboring cell from the neighboring network device, so that the serving network device may determine a paging area based on the occupation status of the SRS resource in the neighboring cell.

In a possible implementation, the location server may send positioning area information of the positioning area to the serving network device. The positioning area may be used by the terminal device to send an SRS in the positioning area. Alternatively, the location server may send positioning area information of the positioning area to the terminal device. The positioning area may be used by the terminal device to send an SRS in the positioning area.

Based on the solution, the location server may send the positioning area information to the serving network device, or send the positioning area information to the serving network device through the terminal device, to assist the serving network device in determining the paging area.

According to a fourth aspect, a communication apparatus is provided. The apparatus may include modules/units configured to perform the method in any one of the first aspect or the possible implementations of the first aspect, may further include modules/units configured to perform the method in any one of the second aspect or the possible implementations of the second aspect, or may further include modules/units configured to perform the method in any one of the third aspect or the possible implementations of the third aspect, for example, a processing unit and a communication unit.

For example, when the apparatus includes modules/units configured to perform the method in any one of the first aspect or the possible implementations of the first aspect, the communication unit is configured to receive positioning area information, where a positioning area represented by the positioning area information is used by a terminal device to send a sounding reference signal SRS in an inactive mode or an idle mode; the processing unit is configured to generate a paging message; and the communication unit is configured to send the paging message to one or more neighboring network devices in a paging area, where the paging area is determined based on the positioning area.

In a design, the communication unit is further configured to receive first information from a location server. The first information indicates an occupation status of each of one or more first SRS resources in each of a plurality of cells in the positioning area. The occupation status is "occupied", or the occupation status is "not occupied". The first information is used to determine the paging area. The paging area is a first cell set of a plurality of cells in the positioning area. A quantity of cells in which one or more second SRS resources are occupied in the plurality of cells included in the first cell set is less than or equal to a first threshold. The one or more second SRS resources are a part or all of the one or more first SRS resources.

In a design, before receiving the first information from the location server, the communication unit is further configured to send the one or more first SRS resources to the location server. The one or more first SRS resources are SRS resources to be configured by the communication apparatus for the terminal device. The one or more first SRS resources are used to determine the first information.

In a design, the communication unit is further configured to receive one or more third SRS resources from one or more neighboring network devices located in the positioning area. The one or more third SRS resources are not occupied. The one or more third SRS resources are used to determine the paging area. The paging area is a second cell set of a plurality of cells in the positioning area. A quantity of cells in which one or more fourth SRS resources are occupied in the plurality of cells included in the second cell set is less than or equal to a second threshold. The one or more fourth SRS resources are a part or all of the one or more third SRS resources.

In a design, before receiving the one or more third SRS resources from the one or more neighboring network devices located in the positioning area, the communication unit is further configured to send one or more fifth SRS resources to the one or more neighboring network devices located in the positioning area. The one or more fifth SRS resources are SRS resources to be configured by the communication apparatus for the terminal device. The one or more third SRS resources are a part or all of the one or more fifth SRS resources.

In a design, before receiving the one or more third SRS resources from the one or more neighboring network devices located in the positioning area, the communication unit is further configured to send a first request message to the one or more neighboring network devices located in the positioning area. The first request message is used to request an occupied SRS resource, and/or used to request an unoccupied SRS resource.

In a design, the communication unit is further configured to: send a sixth SRS resource to one or more neighboring network devices located in the positioning area, where the sixth SRS resource is an SRS resource to be configured by the communication apparatus for the terminal device; and receive a first message from the one or more neighboring network devices in the positioning area, where the first message indicates that the sixth SRS resource is occupied or not occupied, the first message is used to determine the paging area, the paging area is a third cell set of a plurality of cells in the positioning area, and a quantity of cells in which the sixth SRS resource is occupied in the plurality of cells included in the third cell set is less than or equal to a third threshold.

In a design, the paging area is the same as the positioning area, or the paging area is a part of the positioning area.

In a design, the communication unit is further configured to: send a second message to the terminal device, where the second message is used to release the terminal device to the inactive mode or the idle mode, and the second message includes information about the paging area; receive information about the terminal device from a core network device, where the information about the terminal device from the core network device is used to trigger the communication apparatus to send the paging message to the one or more neighboring network devices in the paging area; and send a paging signal.

For example, when the apparatus includes modules/units configured to perform the method in any one of the second aspect or the possible implementations of the second aspect, the communication unit is configured to receive a paging message from a serving network device, where the paging message includes paging area information, and a paging area represented by the paging area information is determined based on a positioning area; the processing unit is configured to generate a paging signal based on the paging message; and the communication unit is further configured to send the paging signal.

In a design, the communication unit is further configured to send one or more first SRS resources to a location server. The one or more first SRS resources are not occupied.

In a design, before sending the one or more first SRS resources to the location server, the communication unit is further configured to receive one or more second SRS resources from the location server. The one or more second SRS resources are SRS resources to be configured by the serving network device for a terminal device. The one or more first SRS resources are a part or all of the one or more second SRS resources.

In a design, before sending the one or more first SRS resources to the location server, the communication unit is further configured to receive a first request message from the location server. The first request message is used to request an occupied SRS resource, and/or used to request an unoccupied SRS resource.

In a design, before receiving the paging message from the serving network device, the communication unit is further configured to: receive a third SRS resource from the serving network device, where the third SRS resource is an SRS resource to be configured by the serving network device for a terminal device; and send a first message to the serving network device, where the first message indicates that the third SRS resource is not occupied.

In a design, before receiving the paging message from the serving network device, the communication unit is further configured to: send one or more fourth SRS resources to the serving network device. The one or more fourth SRS resources are not occupied.

In a design, before sending the one or more fourth SRS resources to the serving network device, the communication unit is further configured to receive one or more fifth SRS resources from the serving network device. The one or more fifth SRS resources are SRS resources to be configured by the serving network device for a terminal device. The one or more fourth SRS resources are a part or all of the one or more fifth SRS resources.

In a design, before sending the one or more fourth SRS resources to the serving network device, the communication unit is further configured to receive a second request message from the serving network device. The second request message is used to request an occupied SRS resource, and/or used to request an unoccupied SRS resource.

For example, when the apparatus includes modules/units configured to perform the method in any one of the third aspect or the possible implementations of the third aspect, the communication unit is configured to receive an occupation status of each of one or more first SRS resources from one or more neighboring network devices in a positioning area, where the occupation status is "occupied", or the occupation status is "not occupied"; the processing unit is configured to generate first information based on the occupation status of each of the one or more first SRS resources from the one or more neighboring network devices in the positioning area, where the first information indicates the occupation status of each of the one or more first SRS resources in a plurality of cells in the positioning area, and the first information is used to determine a paging area; and the communication unit is further configured to send the first information to a serving network device.

In a design, before receiving the occupation status of each of the one or more first SRS resources from the one or more neighboring network devices in the positioning area, the communication unit is further configured to: receive one or more second SRS resources from the serving network device, where the one or more second SRS resources are SRS resources to be configured by the serving network device for a terminal device, and the one or more first SRS resources are a part or all of the one or more second SRS resources; and send the one or more second SRS resources to the one or more neighboring network devices in the positioning area.

In a design, before receiving the occupation status of each of the one or more first SRS resources from the one or more neighboring network devices in the positioning area, the communication unit is further configured to send a first request message to the one or more neighboring network devices in the positioning area. The first request message is used to request an occupied SRS resource, and/or used to request an unoccupied SRS resource.

In a design, the communication unit is further configured to: send positioning area information of the positioning area to the serving network device, where the positioning area is used by the terminal device to send a sounding reference signal SRS in an inactive mode or an idle mode; or send positioning area information of the positioning area to the terminal device, where the positioning area is used by the terminal device to send a sounding reference signal SRS in an inactive mode or an idle mode.

According to a fifth aspect, a communication apparatus is provided. The communication apparatus includes at least one processor. The processor executes computer instructions in a memory to implement a processing operation in the method in any one of the foregoing aspects or the possible implementations of the aspects.

In a possible implementation, the processor executes the computer instructions in the memory through an interface.

In a possible implementation, the communication apparatus further includes a memory. The memory is configured to store computer-executable instructions. When a controller runs, the processor executes the computer-executable instructions in the memory, to perform a processing operation in any one of the foregoing aspects or the possible implementations of the aspects by using a hardware resource in the controller.

In a possible implementation, the memory may be deployed outside the communication apparatus and connected to the communication apparatus, or may be deployed inside the communication apparatus.

In a possible implementation, the processor and the memory are integrated.

In a possible implementation, the communication apparatus further includes a transceiver. The transceiver is configured to: perform sending and receiving operations in the method in any one of the first aspect or the possible implementations of the first aspect, perform sending and receiving operations in the method in any one of the second aspect or the possible implementations of the second aspect, or perform sending and receiving operations in the method in any one of the third aspect or the possible implementations of the third aspect.

According to a sixth aspect, a chip is provided. The chip includes a logic circuit and a communication interface. The communication interface is configured to: perform sending and receiving operations in the method in any one of the first aspect or the possible implementations of the first aspect, perform sending and receiving operations in the method in any one of the second aspect or the possible implementations of the second aspect, or perform sending and receiving operations in the method in any one of the third aspect or the possible implementations of the third aspect. The logic circuit is configured to: perform a processing operation in the method in any one of the first aspect or the possible implementations of the first aspect, perform a processing operation in the method in any one of the second aspect or the possible implementations of the second aspect, or perform a processing operation in the method in any one of the third aspect or the possible implementations of the third aspect.

For example, the communication interface is configured to input positioning area information, where a positioning area represented by the positioning area information is used by a terminal device to send a sounding reference signal SRS in an inactive mode or an idle mode; the logic circuit is configured to generate a paging message; and the communication interface is further configured to output the paging message to one or more neighboring network devices included in a paging area, where the paging area is determined based on the positioning area.

For example, the communication interface is configured to input a paging message from a serving network device, where the paging message includes paging area information, and a paging area represented by the paging area information is determined based on a positioning area; the logic circuit is configured to generate a paging signal based on the paging message; and the communication interface is further configured to output the paging signal.

For example, the communication interface is configured to input an occupation status of each of one or more first SRS resources from one or more neighboring network devices in a positioning area, where the occupation status is "occupied", or the occupation status is "not occupied"; the logic circuit is configured to generate first information based on the occupation status of each of the one or more first SRS resources from the one or more neighboring network devices in the positioning area, where the first information indicates the occupation status of each of the one or more first SRS resources in each of a plurality of cells in the positioning area, and the first information is used to determine a paging area; and the communication interface is further configured to output the first information to a serving network device.

According to a seventh aspect, this application provides a computer-readable storage medium. The computer-readable storage medium stores instructions. When the instructions run on a computer, the computer is enabled to perform the methods in the foregoing aspects.

According to an eighth aspect, this application provides a computer program product that stores instructions. When the computer program product runs on a computer, the computer is enabled to perform the methods in the foregoing aspects.

According to a ninth aspect, this application provides a communication system, including at least one of the foregoing network devices and at least one of the foregoing location servers.

In addition, for beneficial effects in the fourth aspect to the ninth aspect, refer to the beneficial effects shown in the first aspect to the third aspect.

DESCRIPTION OF EMBODIMENTS

Figure 1:
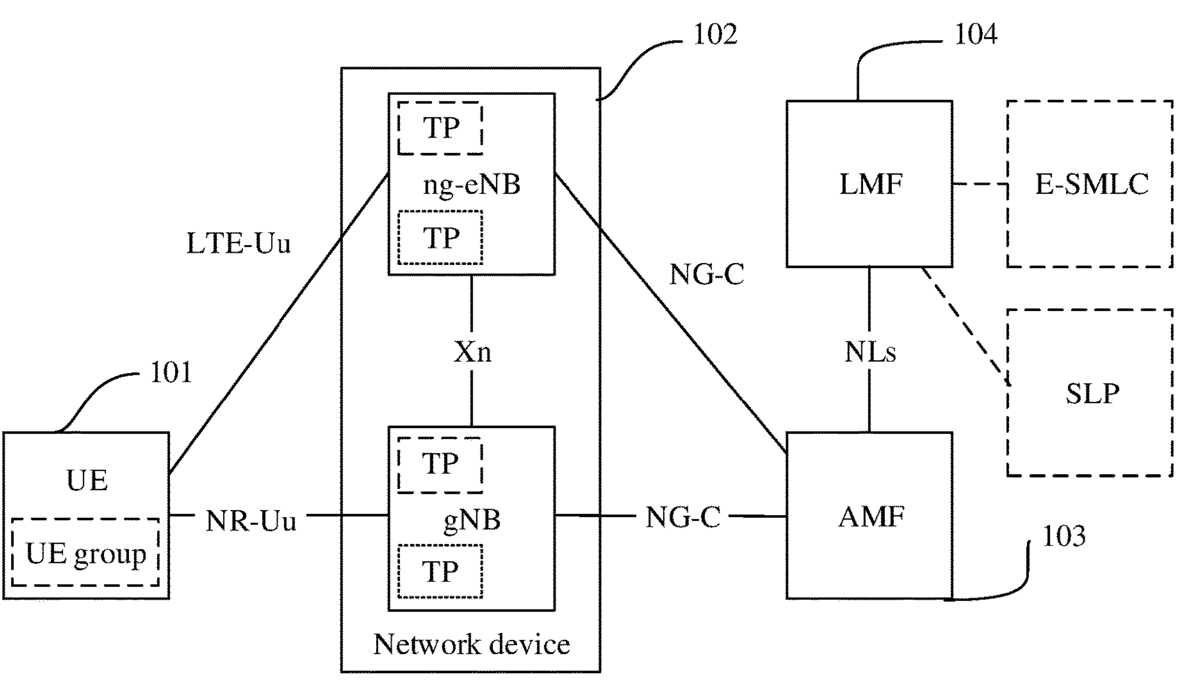
FIG. 1 is a schematic diagram of a communication system according to an embodiment of this application.

Terms in embodiments of this application are explained and described below.

1. A cell area ("cell") may refer to a physical cell served by a base station/network device or a logical cell. The physical cell may be a plurality of cells obtained through division during network deployment, and each physical cell may have one physical cell identifier (PCI). The logical cell may include one or more physical cells. In the logical cell, a terminal device may send and receive data by using a same resource.

2. That a resource is occupied may mean that the resource is occupied by a terminal device that accesses a cell, or may be understood as that the resource is unavailable.

3. That a resource is not occupied may alternatively be understood as that the resource is available, and may mean that the resource is not occupied by a terminal device that accesses a cell, and a network side may allocate the unoccupied resource to the terminal device that accesses the cell.

4. A neighboring network device may be a network device that manages another cell. The another cell herein may include a cell in a positioning area and a cell in a paging area. It should be understood that the neighboring network device may be located in the positioning area or the paging area, or may be located outside the positioning area or the paging area.

The terms "system" and "network" in embodiments of this application may be interchangeably used. "A plurality of" means two or more, and another quantifier is similar to this. The term "and/or" describes an association relationship between associated objects, and indicates that three relationships may exist. For example, A and/or B may indicate the following three cases: Only A exists, both A and B exist, and only B exists. In addition, an element (element) that appears in singular forms "a", "an", and "the" does not mean "one or only one" unless otherwise specified in the context, but means "one or more". For example, "a device" means one or more such devices. Further, "at least one of (at least one of) . . . " means one or any combination of subsequent associated objects. For example, "at least one of A, B, and C" includes A, B, C, AB, AC, BC, or ABC.

The technical solutions provided in embodiments of this application are described below with reference to the accompanying drawings.

In a 4th generation mobile communication system LTE network, there are mainly two RRC connection modes: an RRC connected mode (RRC_CONNECTED) and an RRC idle mode (RRC_IDLE). After accessing a network and establishing an RRC connection to a serving base station, a terminal device is in the RRC_CONNECTED mode. In this case, the terminal device may normally exchange data and signaling with the serving base station. When the terminal device temporarily has no data transmission requirement, to save energy and resources, the network ends the RRC connection of the terminal device, and releases a related radio resource. The terminal device changes from the RRC_CONNECTED mode to the RRC_IDLE mode, and a tracking area (TA) is configured for the terminal device. The TA area includes a group of base stations, and a TA area to which each base station belongs is configured in a network deployment phase. The terminal device may move between different cells in the TA area without notifying the network. When the network needs to send data to the terminal device, paging is initiated in the TA area to which the terminal device belongs. Each base station in the TA area sends a paging signal. After receiving the paging signal, the terminal device re-initiates random access, applies to establish an RRC connection to the network, and switches from the RRC_IDLE mode to the RRC_CONNECTED mode. A range of the TA area is usually large. Therefore, a large quantity of network resources are occupied to page the terminal device. In addition, in the RRC_IDLE mode, the serving base station releases context information of the terminal device. Consequently, there is a high latency when the terminal device switches from the RRC_IDLE mode to the RRC_CONNECTED mode.

To resolve problems of paging overheads and a connection latency, a new RRC connection mode, namely, an RRC inactive mode (RRC_INACTIVE), is provided in a 5G NR standard. When the terminal device switches from the RRC connected mode to the RRC inactive mode, the serving base station stores the context information of the terminal device. Therefore, a lower latency can be implemented during re-access. When the terminal device switches from the RRC connected mode to the RRC inactive mode, the serving base station configures an RNA for the terminal device, and the terminal device may move freely in the RNA area without notifying the serving base station. When moving out of the RNA area, the terminal device initiates an RNA update procedure. When the network needs to send data to the terminal device, a paging procedure may be initiated in the RNA area. In a 5G NR network, the RNA area is configured by the serving base station. However, due to a security problem, in the 5G NR network, the serving base station cannot obtain accurate location information of the terminal device. Therefore, there may be a frequent switching problem in the RNA area configured by the serving base station. For example, the terminal device frequently moves at a boundary of two RNAs. Further, there may be a problem of excessively high paging overheads. For example, when a size of the RNA area is close to that of the TA area, a larger RAN area indicates higher paging overheads.

Based on the foregoing problem, embodiments of this application provide a paging method and an apparatus. In the method, a core network location server (location management function, LMF) may assist a serving base station in configuring an RNA area for a terminal device. In a 5G NR network, location information of all terminal devices is managed by the LMF. Based on a historical moving track of the terminal device, an approximate moving range of the terminal device can be obtained. When the terminal device switches from an RRC connected mode to an RRC inactive mode, if the approximate moving range of the terminal device can be known, the serving base station can configure an accurate RNA area, to improve paging efficiency of the terminal device and reduce paging overheads.

The technical solutions in embodiments of this application may be applied to various communication systems, for example, a Long Term Evolution (LTE) system, a Worldwide Interoperability for Microwave Access (WiMAX) communication system, a future Fifth Generation (5G) system, for example, a New Radio access technology (NR), and a future communication system, for example, a 6G system.

Various aspects, embodiments, or features are presented in this application by using a system that may include a plurality of devices, components, modules, and the like. It should be understood and appreciated that each system may include another device, component, module, and the like, and/or may not include all devices, components, modules, and the like described with reference to the accompanying drawings. In addition, a combination of these solutions may be used.

The network architecture and the service scenario described in embodiments of this application are intended to describe the technical solutions in embodiments of this application more clearly, and do not constitute a limitation on the technical solutions provided in embodiments of this application. A person of ordinary skill in the art may learn that with evolution of the network architecture and emergence of a new service scenario, the technical solutions provided in embodiments of this application are also applicable to similar technical problems.

For ease of understanding embodiments of this application, a communication system shown in FIG. 1 is first used as an example to describe in detail a communication system applicable to embodiments of this application. FIG. 1 is a schematic diagram of a communication system applicable to a paging method according to an embodiment of this application. As shown in FIG. 1, the communication system 100 includes a terminal device 101, a network device 102, an access and mobility management function network element AMF 103, and a location management function network element LMF 104. The network device may be a network device in an LTE system, or may be a network device in a 5G system. The terminal device may communicate with the network device through a Uu interface, and network devices may communicate with each other through an Xn interface. The network device may communicate with the access and mobility management function network element AMF through an NG-C interface. The location management function network element LMF may communicate through an NLs interface Optionally, the location management function network element may include a physical enhanced serving location center (evolved serving mobile location center, E-SMLC) configured to implement a location function, and the location management function network element may implement a location service by using a service location protocol (SLP).

Functions of network elements or devices in the communication system in this embodiment of this application are described below in detail.

The terminal device may also be referred to as user equipment (UE), a mobile station (MS), a mobile terminal (MT), or the like, and is a device that provides voice and/or data connectivity for a user. For example, the terminal device may include a handheld device with a wireless connection function, a vehicle-mounted device, or the like. Currently, the terminal device may be a mobile phone (mobile phone), a tablet computer, a notebook computer, a palmtop computer, a mobile internet device (MID), a wearable device, a virtual reality (VR) device, an augmented reality (AR) device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like. In FIG. 1, the terminal device is shown by using the UE. This is merely used as an example, and does not constitute a limitation on the terminal device.

The network device provides a wireless access service for the terminal device. The network device is a device that connects the terminal device to a wireless network in the communication system. The network device is a node in a radio access network, and may also be referred to as a base station or a radio access network (RAN) node (or device). Currently, some examples of the network device are a gNB, a transmission reception point (TRP), a transmission point (TP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), and a wireless fidelity (Wi-Fi) access point (AP).

The access and mobility management function network element AMF may be configured to manage access control and mobility of the terminal device. In actual application, the access and mobility management function network element includes a mobility management function of a mobility management entity (MME) in a network framework in LTE, and further includes an access management function. Specifically, the access and mobility management function network element may be responsible for registration of the terminal device, mobility management, a tracking area update procedure, reachability detection, selection of a session management function network element, mobility state transition management, and the like. For example, in 5G, the access and mobility management function network element may be an AMF (access and mobility management function) network element. For example, as shown in FIG. 1, in future communication, for example, in 6G, the access and mobility management function network element may still be an AMF network element or have another name. This is not limited in this application. When the access and mobility management function network element is an AMF network element, the AMF may provide an Namf service.

The location management function network element LMF may also be referred to as a location server, and may be configured to: determine a location of the UE, obtain downlink location measurement or location estimation from the UE, and so on. For example, in 5G, the location management function network element (LMF) is shown in FIG. 1. In a future communication system, for example, in 6G, the location management function network element may still be an LMF network element or have another name. This is not limited in this application.

Figure 2:
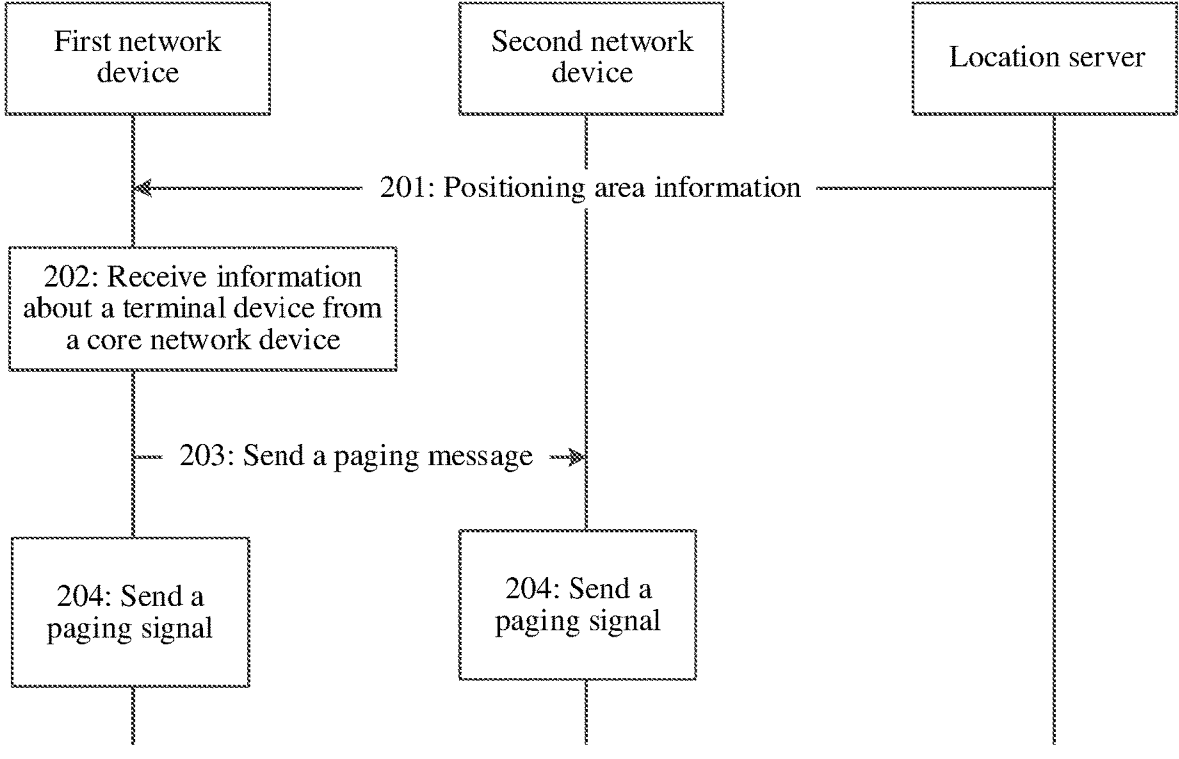
FIG. 2 is an example flowchart of a paging method according to an embodiment of this application.

FIG. 2 is an example flowchart of a paging method according to an embodiment of this application. The paging method may include the following operations.

201: A first network device receives positioning area information.

In this embodiment of this application, the first network device may be a network device that is providing a service for a terminal device, and may also be referred to as a serving network device. The positioning area information may be related information of a positioning area determined by a location server for the terminal device. The positioning area information may be from the location server, or the positioning area information may be from the terminal device. For example, the location server may send the positioning area information to the terminal device, and the terminal device sends the positioning area information to the first network device. The terminal device may send a sounding reference signal (SRS) in an inactive mode or an idle mode in the positioning area. The positioning area may include a plurality of cells. The positioning area may be determined by the location server based on the first network device that is providing a service for the terminal device. For example, the location server may determine a neighboring network device of the first network device, and the location server may use cells managed by the first network device and the neighboring network device as the positioning area. Alternatively, the location server may determine a cell on which the terminal device currently camps, and obtain information about a neighboring cell of the cell, and the location server may use the cell on which the terminal device currently camps and the neighboring cell of the cell as the positioning area. Optionally, the positioning area may be an administrative area. The location server may obtain current location information of the terminal device, determine, based on the location information, an administrative area in which the terminal device is located, and use the administrative area as the positioning area.

In an example, the positioning area information may be an identifier. Optionally, the identifier may be associated with a list, and the list may be a cell list. The cell list may include an identifier of one or more cells, and the area may include the one or more cells. Alternatively, the identifier may be associated with geographical location information, for example, may be associated with an administrative area. Alternatively, the identifier may be associated with at least one network device, and the positioning area may include a cell managed by the at least one network device.

In another example, the area information may be a cell list. The cell list may include an identifier of one or more cells, and the one or more cells constitute the positioning area.

In this embodiment of this application, the location server may send the positioning area information to the first network device by using a positioning information request message (positioning information request).

Optionally, after the terminal device has no data transmission requirement, the first network device may send an RRC release (RRC release) message to the terminal device, to release the terminal device to the inactive mode or the idle mode.

202: The first network device receives information about the terminal device from a core network device.

After the terminal device is released to the inactive mode or the idle mode, if the first network device receives data or signaling information of the terminal device released to the inactive mode or the idle mode from the core network device, the following step 203 may be performed.

203: The first network device sends a paging message to one or more second network devices.

The one or more second network devices herein may be network devices that are determined by the first network device and that manage cells included in a paging area. The first network device may determine the paging area based on the positioning area recommended by the location server. When receiving the data or the signaling information of the terminal device from the core network, the first network device may initiate a RAN paging procedure, and send the paging message to a neighboring network device in the paging area.

204: The second network device sends a paging signal.

After receiving the paging signal, the terminal device may initiate random access, switch to a connected mode, and communicate with the serving network device.

Based on the solution, the paging area of the terminal device is determined based on the positioning area of the terminal device, and the positioning area is determined based on the location information of the terminal device. Therefore, a problem that the terminal device frequently switches a connection mode in the paging area can be reduced, and a paging failure problem can be reduced. In addition, the paging area is a part or all of the positioning area, and is less than a current TA area. Therefore, paging overheads can be reduced.

A manner in which the first network device determines the paging area is explained and described below. There may be a manner 1 and a manner 2.

Manner 1: The serving network device exchanges information with the neighboring network device to determine the paging area.

In a possible implementation, the first network device may send configuration information of an SRS resource to one or more third network devices. The one or more third network devices herein may be neighboring network devices that manage cells included in the positioning area. The one or more second network devices may be a part or all of the one or more third network devices. The one or more third network devices may send a first message to the first network device based on a status of an SRS resource in a cell managed by the one or more third network devices. The first message may indicate whether the SRS resource from the first network device in the cell managed by the one or more third network devices is occupied. It should be understood that configuration information of SRS resources sent by the first network device to all the third network devices may be the same or different. For example, the first network device may send configuration information of an SRS resource 1 and configuration information of an SRS resource 2 to a third network device A, and the first network device may send the configuration information of the SRS resource 1 and the configuration information of the SRS resource 2 to a third network device B, or the first network device may send the configuration information of the SRS resource 1 to a third network device B.

For example, the first network device may send the configuration information of the SRS resource 1 to one or more third network devices in the positioning area. The third network device that receives the configuration information of the SRS resource 1 may determine whether the SRS resource 1 is occupied by the terminal device in a cell managed by the third network device. For example, cells managed by the third network device A include a cell 1, a cell 2, and a cell 3. The third network device A may determine that the SRS resource 1 in the cell 1 is occupied by the terminal device, the SRS resource 1 in the cell 2 is not occupied by the terminal device, and the SRS resource 1 in the cell 3 is not occupied by the terminal device. In this case, the third network device A may send a first message to the first network device. The first message may include a cell identifier and a first identifier. For example, the first message may include an identifier of the cell 1, a corresponding first identifier indicating that the SRS resource 1 is occupied, an identifier of the cell 2, a corresponding first identifier indicating that the SRS resource 1 is not occupied, an identifier of the cell 3, and a corresponding first identifier indicating that the SRS resource 1 is not occupied. The first identifier may be one bit. For example, "0" indicates that the SRS resource is occupied, "1" indicates that the SRS resource is not occupied, and vice versa. Alternatively, the first identifier may be a bit sequence. A relationship between a value of the bit sequence and whether the SRS resource is occupied or not occupied may be specified in a communication protocol, may be indicated by the first network device, or may be indicated by the location server. This is not specifically limited in this application.

In an example, the third network device may alternatively send an identifier of a cell in which the SRS resource is not occupied to the first network device. For example, the third network device may send a first message to the first network device. The first message may include identifiers of the cell 2 and the cell 3. Optionally, the first message may further include a first identifier, and the first identifier may indicate that the SRS resource is not occupied.

In another example, the third network device may alternatively send an identifier of a cell in which the SRS resource is occupied to the first network device. For example, the third network device may send a first message to the first network device. The first message may include an identifier of the cell 1. Optionally, the first message may further include a first identifier, and the first identifier may indicate that the SRS resource is occupied.

Based on the method, the first network device may determine the cell in which the SRS resource is occupied and the cell in which the SRS resource is not occupied in the cells in the positioning area, and the first network device may determine the paging area for the terminal device based on the occupation status of the SRS resource.

In an example, in the paging area determined by the first network device, a quantity of cells in which the SRS resource is occupied is less than or equal to a first threshold. The first threshold herein may be indicated by the location server, may be independently determined by the first network device, or may be specified in a communication protocol. This is not specifically limited in this application. For example, in the paging area determined by the first network device, the quantity of cells in which the SRS resource is occupied may be less than or equal to 2, 1, or 0.

If the first threshold is 0, the first network device may select all cells in which the SRS resource is not occupied as the paging area. For example, the positioning area includes the third network device A, the third network device B, and a third network device C. The cells managed by the third network device A include the cell 1, the cell 2, and the cell 3, cells managed by the third network device B include a cell 4, a cell 5, and a cell 6, and cells managed by the third network device C include a cell 7, a cell 8, and a cell 9. The first network device sends the configuration information of the SRS resource 1 to each of the three third network devices. Each third network device may send a first message to the first network device based on an occupation status of the resource in the cell managed by the third network device. The SRS resource 1 is occupied in the cell 1, the cell 2, the cell 3, and the cell 6. Therefore, the first network device may use the cell 4, the cell 5, the cell 7, the cell 8, and the cell 9 as the paging area. Optionally, the first network device may select a third network device for which the SRS resource is occupied in none of managed cells from the one or more third network devices as the second network device, and use an area managed by the second network device as the paging area. For example, the first network device may select the third network device C from the third network devices A, B, and C as the second network device, and use the cell 7, the cell 8, and the cell 9 as the paging area.

In another possible implementation, the first network device may send configuration information of an SRS resource pool to each of one or more third network devices. The SRS resource pool may include one or more SRS resources. The third network device may send first information to the first network device based on an occupation status of the resource in a cell managed by the third network device. The first information may indicate an occupation status of the one or more SRS resources from the first network device in the cell managed by the third network device. It should be understood that configuration information of SRS resource pools sent by the first network device to all the third network devices may be the same or different. Optionally, the first network device may group the one or more SRS resources into different SRS resource sets. In this case, the SRS resource pool may include one or more SRS resource sets, and each SRS resource set may include one or more SRS resources. Optionally, SRS resources in a same SRS resource set have a same period and a same power control parameter, that is, sent at same power. Different SRS resources have independent parameters such as a quantity of symbols and a frequency domain start location.

For example, the first network device may send configuration information of an SRS resource pool 1 to one or more third network devices in the positioning area. The third network device that receives the configuration information of the SRS resource pool 1 may determine whether an SRS resource in the SRS resource pool 1 is occupied in a cell managed by the third network device. For example, the SRS resource pool 1 includes an SRS resource set 1 and an SRS resource set 2. The SRS resource set 1 includes an SRS resource 1 and an SRS resource 2, and the SRS resource set 2 may include an SRS resource 3 and an SRS resource 4. Cells managed by a third network device A include a cell 1, a cell 2, and a cell 3. The SRS resource 1 and the SRS resource 2 are occupied in the cell 1, the SRS resource 1, the SRS resource 2, and the SRS resource 4 are occupied in the cell 2, and none of the SRS resource 1, the SRS resource 2, the SRS resource 3, and the SRS resource 4 is occupied in the cell 3. Therefore, the third network device A may send first information to the first network device. The first information may include a cell identifier, a resource identifier, and a first identifier. Optionally, the first information may further include a resource set identifier. The first information sent by the third network device A to the first network device is used as an example below for description.

TABLE 1

| Cell identifier | Resource set identifier | Resource identifier | First identifier |
|---|---|---|---|
| Cell 1 | SRS resource set 1 | SRS resource 1 | 0 |
| | | SRS resource 2 | 0 |
| | SRS resource set 2 | SRS resource 3 | 1 |
| | | SRS resource 4 | 1 |
| Cell 2 | SRS resource set 1 | SRS resource 1 | 0 |
| | | SRS resource 2 | 0 |
| | SRS resource set 2 | SRS resource 3 | 1 |
| | | SRS resource 4 | 0 |
| Cell 3 | SRS resource set 1 | SRS resource 1 | 1 |
| | | SRS resource 2 | 1 |
| | SRS resource set 2 | SRS resource 3 | 1 |
| | | SRS resource 4 | 1 |

In Table 1, "0" indicates that the resource is occupied, and "1" indicates that the resource is not occupied.

Optionally, the first information may alternatively include a cell identifier and a resource identifier. The resource identifier herein may be an identifier of an occupied resource, or may be an identifier of an unoccupied resource. Optionally, the first information may further include a resource set identifier. The first information sent by the third network device A to the first network device is used as an example for description. The first information may include an identifier of the cell 1, the SRS resource 1 and the SRS resource 2 corresponding to the cell 1, an identifier of the cell 2, and the SRS resource 1, the SRS resource 2, and the SRS resource 4 corresponding to the cell 2. Optionally, the first information may further include a first identifier, and the first identifier indicates that the resource is occupied. Alternatively, the first information may include an identifier of the cell 1, the SRS resource 3 and the SRS resource 4 corresponding to the cell 1, an identifier of the cell 2, the SRS resource 3 corresponding to the cell 2, an identifier of the cell 3, and the SRS resource 1, the SRS resource 2, the SRS resource 3, and the SRS resource 4 corresponding to the cell 3, as shown in Table 2. Optionally, the first information may further include a first identifier, and the first identifier indicates that the resource is not occupied.

TABLE 2

| Cell identifier | Resource set identifier | Resource identifier |
|---|---|---|
| Cell 1 | SRS resource set 2 | SRS resource 3 |
| | | SRS resource 4 |
| Cell 2 | SRS resource set 2 | SRS resource 3 |
| Cell 3 | SRS resource set 1 | SRS resource 1 |
| | | SRS resource 2 |
| | SRS resource set 2 | SRS resource 3 |
| | | SRS resource 4 |

Based on the method, the first network device may determine the occupation status of the SRS resource in the SRS resource pool in the cell in the positioning area, and the first network device may determine the paging area for the terminal device based on the occupation status of the SRS resource.

In an example, the first network device may select, based on an occupation status of the SRS resource pool in a cell managed by the one or more third network devices, an SRS resource that is not occupied in as many cells as possible or an SRS resource that is not occupied in as large a cell range as possible, and use a cell in which the SRS resource is not occupied as the paging area. In the paging area determined by the first network device, a quantity of cells in which a target SRS resource is occupied is less than or equal to a second threshold. The second threshold herein may be indicated by the location server, may be independently determined by the first network device, or may be specified in a communication protocol. This is not specifically limited in this application. For example, in the paging area determined by the first network device, the quantity of cells in which the target SRS resource is occupied may be less than or equal to 2, 1, or 0. The target SRS resource may be a part or all of the SRS resources in the SRS resource pool. Optionally, the target SRS resource may belong to one SRS resource set, or may belong to different SRS resource sets. This is not specifically limited in this application.

If the second threshold is 0, the first network device may select all cells in which the target SRS resource is not occupied as the paging area. For example, the positioning area includes the third network device A, a third network device B, and a third network device C. The first information fed back by the third network device A may be shown in Table 1 or Table 2. Without loss of generality, the cell managed by the third network device A is used as an example below to describe a manner in which the first network device determines the paging area. The first network device may determine that the SRS resource 3 is occupied in none of the cells managed by the third network device A. Therefore, the first network device may determine the SRS resource 3 as the target SRS resource, and use the cell 1, the cell 2, and the cell 3 managed by the third network device A as cells in the paging area. For another example, if the first network device determines the SRS resource 4 as the target SRS resource, the first network device may use the cell 1 and the cell 3 as cells in the paging area. It should be understood that a manner in which the first network device determines the cell in the paging area from the cells managed by the third network device B and the third network device C is the same as the manner. Details are not described.

Optionally, if the location server requests the first network device to configure an SRS resource for the terminal device, the first network device may select one or more SRS resources from the target SRS resource, and configure the one or more SRS resources for the terminal device. An advantage of such configuration is that a range of an area in which the terminal device can send the SRS in the inactive mode or the idle mode can be maximized, so that a process in which the terminal device switches to the connected mode to perform SRS reconfiguration can be reduced, and power consumption and system overheads can be reduced.

In still another possible implementation, the first network device may send request information to one or more third network devices. The request information may indicate the third network device to feed back an unoccupied SRS resource. Alternatively, the request information may indicate the third network device to feed back an SRS resource occupied before preset duration. The preset duration herein may be indicated by the first network device, may be indicated by the location server, may be specified in a communication protocol, or may be determined by the third network device. This is not specifically limited in this application. The third network device that receives the request information may send a third message to the first network device based on an occupation status of an SRS resource in a cell managed by the third network device.

In an example, the third message may include the unoccupied SRS resource. For example, the third message may include a cell identifier and the unoccupied SRS resource in the cell. For example, a third network device A receives the request information from the first network device. Cells managed by the third network device A include a cell 1, a cell 2, and a cell 3. Unoccupied SRS resources in the cell 1 include an SRS resource 3, an SRS resource 6, and an SRS resource 7. Unoccupied SRS resources in the cell 2 include an SRS resource 4, an SRS resource 5, and an SRS resource 9. Unoccupied SRS resources in the cell 3 include an SRS resource 2 and the SRS resource 3. Therefore, a third message fed back by the third network device A to the first network device may include an identifier of the cell 1, the SRS resource 3, the SRS resource 6, and the SRS resource 7 corresponding to the cell 1, an identifier of the cell 2, the SRS resource 4, the SRS resource 5, and the SRS resource 9 corresponding to the cell 2, an identifier of the cell 3, and the SRS resource 2 and the SRS resource 3 corresponding to the cell 3.

Alternatively, the third message may include all unoccupied SRS resources in the cell managed by the third network device. For example, the third message may include the SRS resource 3, the SRS resource 6, the SRS resource 7, the SRS resource 4, the SRS resource 5, the SRS resource 9, and the SRS resource 2.

In another example, the third message may include an SRS resource occupied within the preset duration. For example, the third message may include a cell identifier and the SRS resource occupied within the preset duration in the cell. For example, a third network device A receives the request information from the first network device. Cells managed by the third network device A include a cell 1, a cell 2, and a cell 3. SRS resources occupied within the preset duration in the cell 1 include an SRS resource 3 and an SRS resource 7. SRS resources occupied within the preset duration in the cell 2 include an SRS resource 2 and an SRS resource 5. SRS resources occupied within the preset duration in the cell 3 include the SRS resource 2 and the SRS resource 3. Therefore, a third message fed back by the third network device A to the first network device may include an identifier of the cell 1, the SRS resource 3 and the SRS resource 7 corresponding to the cell 1, an identifier of the cell 2, the SRS resource 2 and the SRS resource 5 corresponding to the cell 2, an identifier of the cell 3, and the SRS resource 2 and the SRS resource 3 corresponding to the cell 3.

Alternatively, the third message may include all occupied SRS resources in the cell managed by the third network device. For example, the third message may include the SRS resource 3, the SRS resource 7, the SRS resource 2, and the SRS resource 5.

Based on the method, the first network device may determine the paging area based on the unoccupied SRS resource in the cell managed by the one or more third network devices.

In an example, the first network device may select, based on the unoccupied SRS resource in the cell managed by the one or more third network devices, an SRS resource that is not occupied in as many cells as possible or an SRS resource that is not occupied in as large a cell range as possible, and use a cell in which the SRS resource is not occupied as the paging area. In the paging area determined by the first network device, a quantity of cells in which a target SRS resource is occupied is less than or equal to a third threshold. The third threshold herein may be indicated by the location server, may be independently determined by the first network device, or may be specified in a communication protocol. This is not specifically limited in this application. For example, in the paging area determined by the first network device, the quantity of cells in which the target SRS resource is occupied may be less than or equal to 2, 1, or 0.

If the third threshold is 0, the first network device may select all cells in which the target SRS resource is not occupied as the paging area. For example, the positioning area includes the third network device A and a third network device B. The cells managed by the third network device A include the cell 1, the cell 2, and the cell 3, and the third network device B manages a cell 4, a cell 5, and a cell 6. Unoccupied SRS resources in the cell 1 are an SRS resource 1, the SRS resource 3, the SRS resource 5, and the SRS resource 6. Unoccupied SRS resources in the cell 2 are the SRS resource 1, the SRS resource 2, and the SRS resource 4. Unoccupied SRS resources in the cell 3 are the SRS resource 1, the SRS resource 3, and the SRS resource 6. An unoccupied SRS resource in the cell 4 is the SRS resource 1. Unoccupied SRS resources in the cell 5 are the SRS resource 1 and the SRS resource 4. Unoccupied SRS resources in the cell 6 are the SRS resource 1 and the SRS resource 2. The first network device may determine that the SRS resource 1 is occupied in none of the cell 1 to the cell 6. Therefore, the first network device may determine the SRS resource 1 as the target SRS resource, and use the cell 1 to the cell 6 as the paging area.

Optionally, if there is no SRS resource that is occupied in none of all cells, an SRS resource that is not occupied in a range of as many cells as possible may be selected, and a cell in the SRS resource is not occupied may be used as the paging area. For example, unoccupied SRS resources in the cell 1 are the SRS resource 1, the SRS resource 3, the SRS resource 5, and the SRS resource 6, unoccupied SRS resources in the cell 2 are the SRS resource 2 and the SRS resource 4, unoccupied SRS resources in the cell 3 are the SRS resource 3, the SRS resource 5, and the SRS resource 6, unoccupied SRS resources in the cell 4 are the SRS resource 2, the SRS resource 4, and the SRS resource 6, unoccupied SRS resources in the cell 5 are the SRS resource 1, the SRS resource 2, and the SRS resource 3, and occupied SRS resources in the cell 6 are the SRS resource 4 and the SRS resource 6. The first network device may determine that there is no SRS resource that is occupied in none of all the cells in the positioning area. Therefore, the first network device may determine an SRS resource, namely, the SRS resource 6, that is not occupied in a range of as many cells as possible, and the first network device may determine the cell 1, the cell 3, the cell 4, and the cell 6 in which the SRS resource 6 is not occupied as the paging area.

In a possible implementation, if the location server requests the first network device to configure an SRS resource for the terminal device, the first network device may select one or more SRS resources from the target SRS resource, and configure the one or more SRS resources for the terminal device. An advantage of such configuration is that a range of an area in which the terminal device can send the SRS in the inactive mode or the idle mode can be maximized, so that a process in which the terminal device switches to the connected mode to perform SRS reconfiguration can be reduced, and power consumption and system overheads can be reduced.

Manner 2: The serving network device exchanges information with the location server to determine the paging area.

In a possible implementation, the first network device may send configuration information of one or more SRS resources to the location server. The location server may send the configuration information of the one or more SRS resources to one or more third network devices in the positioning area. The location server may send same configuration information of an SRS resource to all the third network devices.

In an example, after receiving the configuration information of the one or more SRS resources from the location server, the third network device may send a cell identifier and an occupation status of the SRS resource in a cell managed by the third network device to the location server based on the occupation status of the resource in the cell. For example, a third network device A receives configuration information of an SRS resource 1, an SRS resource 2, and an SRS resource 3 from the location server. Cells managed by the third network device A include a cell 1 and a cell 2. The SRS resource 1 is occupied in the cell 1, and the SRS resource 2 and the SRS resource 3 are occupied in the cell 2. Therefore, the third network device may send information shown in Table 3 to the location server.

TABLE 3

| Cell identifier | Resource identifier | First identifier |
|---|---|---|
| Cell 1 | SRS resource 1 | 0 |
| | SRS resource 2 | 1 |
| | SRS resource 3 | 1 |
| Cell 2 | SRS resource 1 | 1 |
| | SRS resource 2 | 0 |
| | SRS resource 3 | 0 |

In Table 3, “0” indicates that the resource is occupied, and “1” indicates that the resource is not occupied.

In another example, the third network device may send a cell identifier and an unoccupied SRS resource in the cell to the location server. For example, the third network device may send an identifier of the cell 1, the SRS resource 2 and the SRS resource 3 corresponding to the cell 1, an identifier of the cell 2, and the SRS resource 1 corresponding to the cell 2 to the location server. Optionally, the third network device may further send a first identifier to the location server, and the first identifier indicates that the SRS resource is not occupied.

In still another example, the third network device may send a cell identifier and an occupied SRS resource in the cell to the location server. For example, the third network device may send an identifier of the cell 1, the SRS 1 corresponding to the cell 1, an identifier of the cell 2, and the SRS resource 2 and the SRS resource 3 corresponding to the cell 2 to the location server. Optionally, the third network device may further send a first identifier to the location server, and the first identifier indicates that the SRS resource is occupied.

After receiving the information fed back by the third network device, the location server may send, to the first network device, the information fed back by the third network device. The first network device may determine the paging area based on the occupation status of the resource in the cell managed by the third network device.

In an example, the first network device may select, based on an occupation status of the one or more SRS resources in a cell managed by the one or more third network devices, an SRS resource that is not occupied in as many cells as possible or an SRS resource that is not occupied in as large a cell range as possible, and use a cell in which the SRS resource is not occupied as the paging area. In the paging area determined by the first network device, a quantity of cells in which a target SRS resource is occupied is less than or equal to a fourth threshold. The fourth threshold herein may be indicated by the location server, may be independently determined by the first network device, or may be specified in a communication protocol. This is not specifically limited in this application. For example, in the paging area determined by the first network device, the quantity of cells in which the target SRS resource is occupied may be less than or equal to 2, 1, or 0. The target SRS resource may be a part or all of the one or more SRS resources.

If the fourth threshold is 0, the first network device may use all cells, in the cell managed by the third network device, in which the target cell resource is not occupied as the paging area. For example, the positioning area includes the third network device A, a third network device B, and a third network device C. Cells managed by the third network device A include the cell 1, the cell 2, and a cell 3, cells managed by the third network device B include a cell 4, a cell 5, and a cell 6, and cells managed by the third network device C include a cell 7, a cell 8, and a cell 9. The one or more SRS resources are the SRS resource 1, the SRS resource 2, and the SRS resource 3. Without loss of generality, an example in which the first network device determines a cell in the paging area from the cell managed by the third network device A is used below to describe a method for determining the cell in the paging area. It should be understood that a method for determining, by the first network device, the cell in the paging area from the cells managed by the third network device B and the third network device C is the same as the method.

In the cells managed by the third network device A, the SRS resource 1 and the SRS resource 2 are not occupied in the cell 1, the SRS resource 1 is not occupied in the cell 2, and none of the SRS resource 1, the SRS resource 2, and the SRS resource 3 is occupied in the cell 3. Therefore, the first network device may determine the SRS resource 1 as the target SRS resource, and use the cell 1, the cell 2, and the cell 3 as cells in the paging area.

Optionally, if there is no SRS resource that is not occupied, an SRS resource that is not occupied in as large a cell range as possible may be determined as the target SRS resource, and a cell in which the target SRS resource is not occupied may be used as the paging area. For example, in the cells managed by the third network device A, the SRS resource 1 and the SRS resource 2 are not occupied in the cell 1, the SRS resource 3 is not occupied in the cell 2, and none of the SRS resource 1, the SRS resource 2, and the SRS resource 3 is occupied in the cell 3. Therefore, if the first network device determines the SRS resource 1 as the target SRS resource, the first network device may determine that the cell 1 and the cell 3 are cells in the paging area. If the first network device determines the SRS resource 2 as the target SRS resource, the first network device may determine that the cell 1 and the cell 3 are cells in the paging area. If the first network device determines the SRS resource 3 as the target SRS resource, the first network device may determine that the cell 2 and the cell 3 are cells in the paging area.

In another possible implementation, the first network device may send configuration information of one or more SRS resources to the location server. The location server may send a request message to one or more third network devices. The request message may be used to request the third network device to report an occupation status of the SRS resource. For a method for reporting the occupation status of the SRS resource by the third network device, refer to the related description in the manner 1. Details are not described herein. The location server may send, to the first network device, the occupation status of the SRS resource reported by the one or more third network devices. Alternatively, the location server may send, to the first network device, an occupation status, in a cell managed by the one or more third network devices, of one or more SRS resources to be configured by the first network device for the terminal device.

The first network device may determine, based on the occupation status of the SRS resource that is reported by the one or more third network devices and that is from the location server, the occupation status, in the cell managed by the one or more third network devices, of the one or more SRS resources to be configured for the terminal device. Alternatively, the first network device may receive, from the location server, the occupation status, in the cell managed by the one or more third network devices, of the one or more SRS resources to be configured for the terminal device. The first network device may determine, based on the occupation status, in the cell managed by the one or more third network devices, of the one or more SRS resources to be configured for the terminal device, an SRS resource that is not occupied in as many cells as possible or an SRS resource that is not occupied in as large a cell range as possible, and use a cell in which the SRS resource is not occupied as the paging area. For details, refer to the related description in the manner 1. Details are not described herein.

Optionally, if the location server requests the first network device to configure an SRS resource for the terminal device, the first network device may select one or more SRS resources from the target SRS resource, and configure the one or more SRS resources for the terminal device. An advantage of such configuration is that a range of an area in which the terminal device can send the SRS in the inactive mode or the idle mode can be maximized, so that a process in which the terminal device switches to the connected mode to perform SRS reconfiguration can be reduced, and power consumption and system overheads can be reduced.

Based on the manner 1 and the manner 2, the first network device may determine the paging area. When needing to send data to the terminal device, the first network device may send a paging message (paging message) to the second network device in the paging area.

The foregoing method is described below by using an example 1 and an example 2.

Example 1

Figure 3:
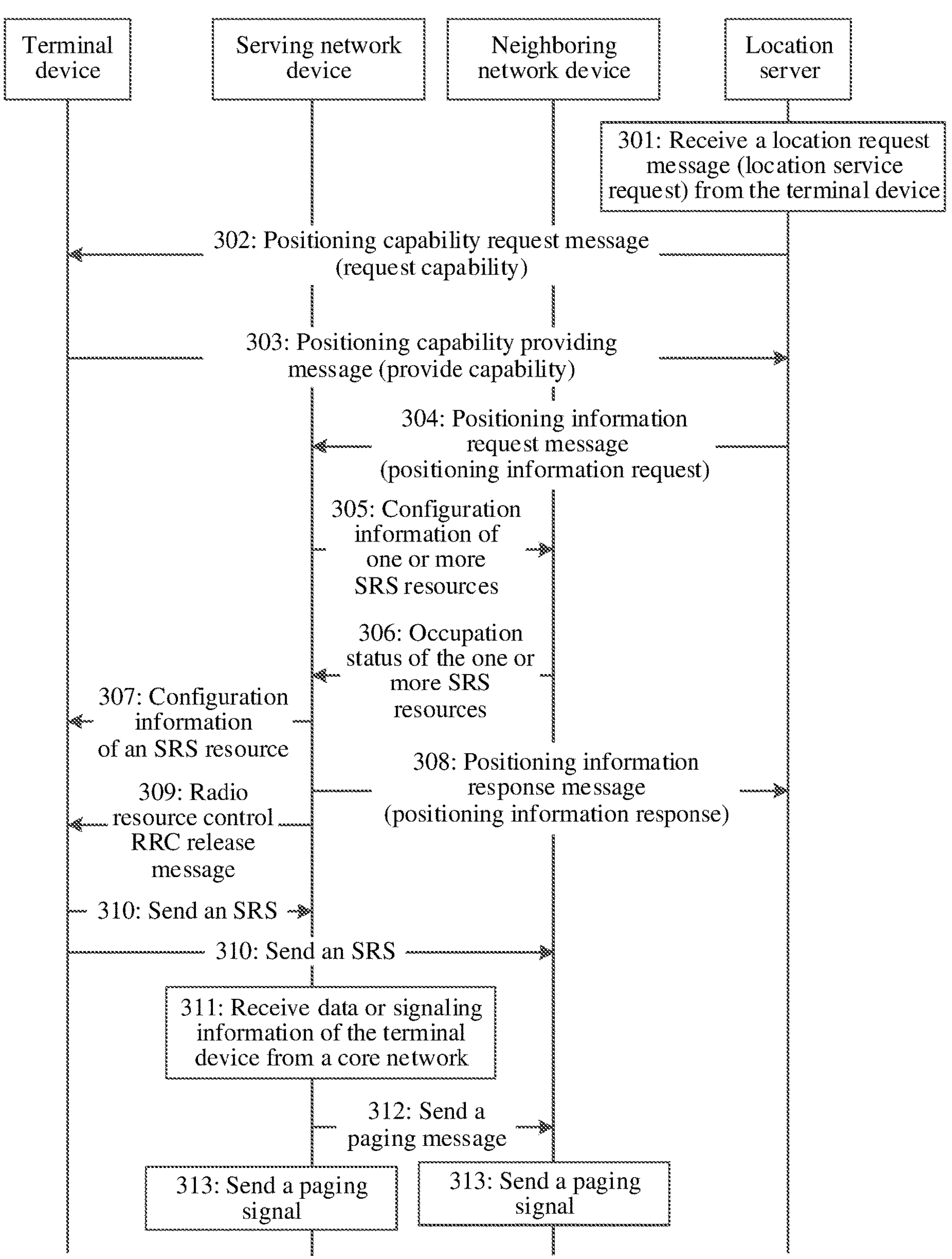
FIG. 3 is an example flowchart of a paging method according to an embodiment of this application.

FIG. 3 is an example flowchart of a paging method according to an embodiment of this application. The paging method may include the following operations.

301: A location server receives a location request message (location service request).

The location request message may be from a terminal device, or may be from a third-party application server.

302: The location server sends a positioning capability request message (request capability) to the terminal device.

The location server may send the positioning capability request message to the terminal device by using an LPP protocol. A positioning capability may include a capability of the terminal device to send an SRS in an inactive mode or an idle mode.

303: The terminal device sends a positioning capability providing (provide capability) message to the location server.

The positioning capability providing message herein may include a positioning capability of the terminal device. The positioning capability may include information indicating that the terminal device supports sending of the SRS in then inactive mode or the idle mode.

304: The location server sends a positioning information request message to a serving network device.

The location server may send the positioning information request message to the serving network device by using an NRPPa protocol. The positioning information request message may be used to request configuration information of an SRS resource determined by the serving network device for the terminal device. The positioning information request message may include information about a positioning area recommended for the terminal device.

305: The serving network device sends configuration information of one or more SRS resources to a neighboring network device.

For the one or more SRS resources, refer to the description in the method embodiment shown in FIG. 2. Details are not described herein.

306: The neighboring network device sends an occupation status of the one or more SRS resources to the serving network device.

The neighboring network device may send a first message or second information to the serving network device, to indicate the occupation status of the one or more SRS resources to the serving network device. For the first message and the second information, refer to the related description in the method embodiment shown in FIG. 2. Details are not described herein.

307: The serving network device sends configuration information of an SRS resource to the terminal device.

The serving network device may determine an SRS resource that is occupied in none of all cells in a paging area for the terminal device, or the serving network device may determine an SRS resource that is occupied in a small quantity of cells in a paging area for the terminal device. For example, when an SRS resource that is occupied in cells whose quantity is less than or equal to a preset value in the paging area, or an SRS resource that is occupied in cells whose quantity percentage in a total quantity of cells in the paging area is less than or equal to a preset value is determined, it may be determined to configure the SRS resource for the terminal device.

308: The serving network device sends a positioning information response message to the location server.

The serving network device may feed back the configuration information of the SRS resource to the location server by using the NRPPa protocol.

309: The serving network device sends an RRC release message to the terminal device.

After the terminal device has no data transmission requirement, the serving network device may send the RRC release (RRC release) message to the terminal device, to release the terminal device to the inactive mode or the idle mode. The RRC release message may include a list of cells included in the paging area, or may include a list of network devices included in the paging area. For a method for determining the paging area, refer to the method embodiment shown in FIG. 2. Details are not described herein.

310: The terminal device sends an SRS based on the configuration information of the SRS resource.

The terminal device may send the SRS in the inactive mode or the idle mode in the paging area. The serving network device and a neighboring network device in the positioning area may receive the SRS.

311: The serving network device receives data or signaling information of the terminal device from a core network.

After the terminal device enters the inactive mode or the idle mode, when receiving the data or the signaling information of the terminal device from the core network, the serving network device may initiate a RAN paging procedure.

312: The serving network device sends a paging message to the neighboring network device.

The serving network device may send the paging message to a neighboring network device in the paging area or a neighboring network device that manages the cell in the paging area. The paging message may include a list of identifiers of the cells in the paging area or a list of identifiers of the network devices in the paging area.

313: The network device sends a paging signal.

After receiving the paging message from the serving network device, the neighboring network device in the paging area may send the paging signal. The serving network device may also send a paging signal. After receiving the paging signal, the terminal device may initiate random access, switch to a connected mode, and receive data or signaling.

Example 2

Figure 4:
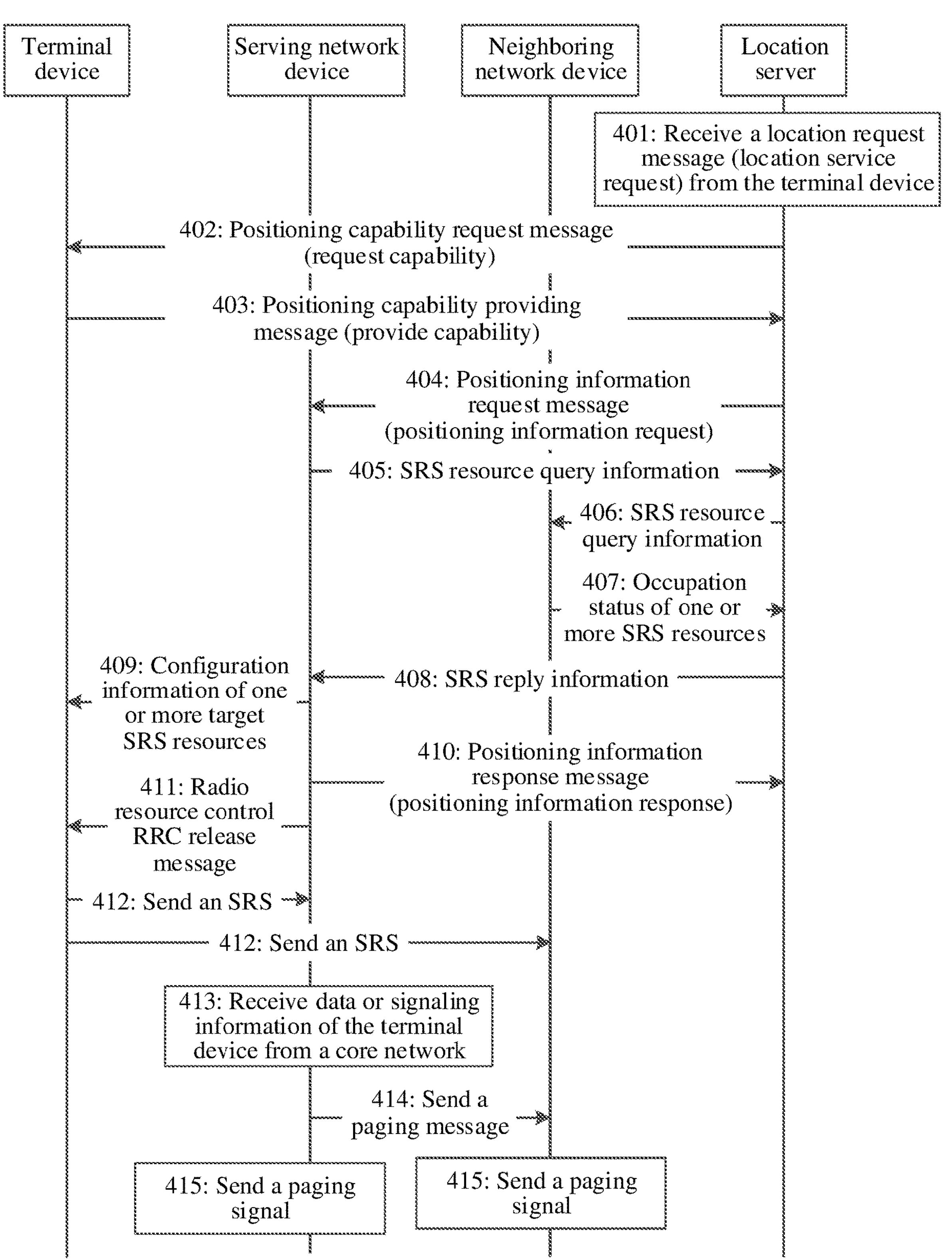
FIG. 4 is an example flowchart of a paging method according to an embodiment of this application.

FIG. 4 is an example flowchart of a paging method according to an embodiment of this application. The paging method may include the following operations.

401 to 404 are the same as 301 to 304.

405: The serving network device sends SRS resource query information to the location server.

The SRS resource query information may include configuration information of one or more SRS resources. For the configuration information of the SRS resource herein, refer to the related description in the method embodiment shown in FIG. 2.

406: The location server sends SRS resource query information to a neighboring network device in a positioning area.

The SRS resource query information herein may include configuration information of one or more SRS resources, and the configuration information of the one or more SRS resources may be the same as that sent by the serving network device to the location server in 405. Optionally, the location server may further indicate the neighboring network device to reserve the configuration information of the one or more SRS resources.

407: The neighboring network device sends an occupation status of the one or more SRS resources to the location server.

The neighboring network device may send the occupation status of the one or more SRS resources to the location server by using a third message. For the third message, refer to the related description in the method embodiment shown in FIG. 2. Details are not described herein.

Optionally, if there is a cell in which the one or more SRS resources are not occupied in a cell managed by the neighboring network device, the neighboring network device may reserve the one or more unoccupied SRS resources.

408: The location server sends SRS resource reply information to the serving network device.

The SRS resource reply information may include the occupation status of the one or more SRS resources. For the occupation status of the one or more SRS resources herein, refer to the related description of the manner 2 in the method embodiment shown in FIG. 2. Details are not described herein.

409: The serving network device sends configuration information of one or more target SRS resources to the terminal device.

The configuration information of the one or more target SRS resources herein may be a part of all of the configuration information that is of the one or more SRS resources and that is sent by the serving network device to the location server in 405. Optionally, the configuration information of the one or more target SRS resources may be determined by the serving network device based on the occupation status of the one or more SRS resources. For example, the configuration information of the one or more target SRS resources may be configuration information of an SRS resource that is occupied in none of all cells managed by the neighboring network device. For details, refer to the related description of the manner 2 in the method embodiment shown in FIG. 2. Details are not described herein.

410: The serving network device sends a positioning information response message to the location server.

The positioning information response message may include the configuration information of the one or more target SRS resources.

411 to 415 are the same as 309 to 313.

Figure 5:
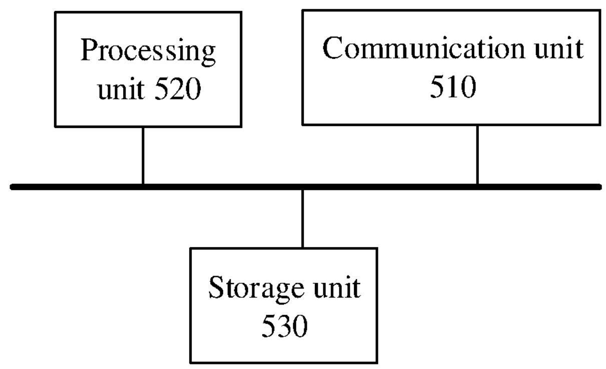
FIG. 5 is a schematic diagram of a communication apparatus according to an embodiment of this application.

Based on a same technical concept as the paging method, an apparatus 500 is provided in FIG. 5. The apparatus 500 can perform operations performed on a side of the network device, a side of the location server, or a side of the terminal device in the foregoing method. To avoid repetition, details are not described herein.

The apparatus 500 includes a communication unit 510 and a processing unit 520, and optionally, further includes a storage unit 530. The processing unit 520 may be separately connected to the storage unit 530 and the communication unit 510, and the storage unit 530 may also be connected to the communication unit 510. The processing unit 520 may be integrated with the storage unit 530. The communication unit 510 may also be referred to as a transceiver, a transceiver machine, a transceiver apparatus, or the like. The processing unit 520 may also be referred to as a processor, a processing board, a processing module, a processing apparatus, or the like. Optionally, a component that is in the communication unit 510 and that is configured to implement a receiving function may be considered as a receiving unit, and a component that is in the communication unit 510 and that is configured to implement a sending function may be considered as a sending unit. In other words, the communication unit 510 includes the receiving unit and the sending unit. The communication unit sometimes may also be referred to as a transceiver machine, a transceiver, a transceiver circuit, or the like. The receiving unit sometimes may also be referred to as a receiver machine, a receiver, a receiver circuit, or the like. The sending unit sometimes may also be referred to as a transmitter, a transmitter machine, a transmitter circuit, or the like.

It should be understood that the communication unit 510 is configured to perform a sending operation and a receiving operation on a side of the serving network device, a side of the neighboring network device, or a side of the location server in the foregoing method embodiments, and the processing unit 520 is configured to perform an operation other than the sending and receiving operations on the side of the serving network device, the side of the neighboring network device, or the side of the location server in the foregoing method embodiments. For example, in an implementation, the communication unit 510 is configured to perform sending and receiving operations on the side of the serving network device and/or the side of the neighboring network device in 201 to 203 in FIG. 2, and/or the communication unit 510 is further configured to perform other sending and receiving operations on the side of the serving network device, the side of the neighboring network device, or the side of the location server in embodiments of this application, and the processing unit 520 is configured to perform a processing operation on the side of the serving network device, the side of the neighboring network device, or the side of the location server in the foregoing method embodiments.

The storage unit 530 is configured to store a computer program.

For example, when the apparatus 500 performs the operations performed by the serving network device in the foregoing method, the communication unit 510 is configured to receive positioning area information; the processing unit 520 is configured to generate a paging message; and the communication unit 510 is configured to send the paging message to one or more neighboring network devices in a paging area. For the positioning area information and the paging area, refer to the related description in the method embodiment shown in FIG. 2. Details are not described herein.

In a design, the communication unit 510 is further configured to receive first information from a location server. For the first information, refer to the related description in the method embodiment shown in FIG. 2. Details are not described herein.

In a design, before receiving the first information from the location server, the communication unit 510 is further configured to send one or more first SRS resources to the location server. For the one or more first SRS resources, refer to the related description in the method embodiment shown in FIG. 2. Details are not described herein.

In a design, the communication unit 510 is further configured to receive one or more third SRS resources from one or more neighboring network devices located in a positioning area. For the one or more third SRS resources, refer to the related description in the method embodiment shown in FIG. 2. Details are not described herein.

In a design, before receiving the one or more third SRS resources from the one or more neighboring network devices located in the positioning area, the communication unit 510 is further configured to send one or more fifth SRS resources to the one or more neighboring network devices located in the positioning area. For the fifth SRS resource, refer to the related description in the method embodiment shown in FIG. 2. Details are not described herein.

In a design, before receiving the one or more third SRS resources from the one or more neighboring network devices located in the positioning area, the communication unit 510 is further configured to send a first request message to the one or more neighboring network devices located in the positioning area. For the first request message, refer to the related description in the method embodiment shown in FIG. 2. Details are not described herein.

In a design, the communication unit 510 is further configured to: send a sixth SRS resource to one or more neighboring network devices located in a positioning area; and receive a first message from the one or more neighboring network devices in the positioning area. For the first message and the sixth SRS resource, refer to the related description in the method embodiment shown in FIG. 2. Details are not described herein.

In a design, the communication unit 510 is further configured to: send a second message to a terminal device; receive information about the terminal device from a core network device; and send a paging signal. For the second message, refer to the related description in the method embodiment shown in FIG. 2. Details are not described herein.

When the apparatus is a chip apparatus or a circuit, the apparatus may include a communication unit 510 and a processing unit 520. The communication unit 510 may be an input/output circuit and/or a communication interface. The processing unit 520 is an integrated processor, a microprocessor, or an integrated circuit. The communication unit 510 may input data and output data, and the processing unit 520 may determine output data based on input data. For example, the communication unit 510 may input positioning area information. The processing unit 520 may determine output data based on input data, for example, generate a paging message. The communication unit 510 may output data, for example, the paging message.

For example, when the apparatus 500 is configured to perform the operations performed by the neighboring network device, the communication unit 510 is configured to receive a paging message from a serving network device, where the paging message includes paging area information; the processing unit 520 is configured to generate a paging signal based on the paging message; and the communication unit 510 is further configured to send the paging signal. For the paging area information, refer to the related description in the method embodiment shown in FIG. 2. Details are not described herein.

In a design, the communication unit 510 is further configured to send one or more first SRS resources to a location server. For the one or more first SRS resources, refer to the related description in the method embodiment shown in FIG. 2. Details are not described herein.

In a design, before sending the one or more first SRS resources to the location server, the communication unit 510 is further configured to receive one or more second SRS resources from the location server. For the one or more second SRS resources, refer to the related description in the method embodiment shown in FIG. 2. Details are not described herein.

In a design, before sending the one or more first SRS resources to the location server, the communication unit 510 is further configured to receive a first request message from the location server. For the first request message, refer to the related description in the method embodiment shown in FIG. 2. Details are not described herein.

In a design, before receiving the paging message from the serving network device, the communication unit 510 is further configured to: receive a third SRS resource from the serving network device; and send a first message to the serving network device. For the third SRS resource and the first message, refer to the related description in the method embodiment shown in FIG. 2. Details are not described herein.

In a design, before receiving the paging message from the serving network device, the communication unit 510 is further configured to send one or more fourth SRS resources to the serving network device. For the one or more fourth SRS resources, refer to the related description in the method embodiment shown in FIG. 2. Details are not described herein.

In a design, before sending the one or more fourth SRS resources to the serving network device, the communication unit 510 is further configured to receive one or more fifth SRS resources from the serving network device. For the one or more fifth SRS resources, refer to the related description in the method embodiment shown in FIG. 2. Details are not described herein.

In a design, before sending the one or more fourth SRS resources to the serving network device, the communication unit 510 is further configured to receive a second request message from the serving network device. For the second request message, refer to the related description in the method embodiment shown in FIG. 2. Details are not described herein.

When the apparatus is a chip apparatus or a circuit, the apparatus may include a communication unit 510 and a processing unit 520. The communication unit 510 may be an input/output circuit and/or a communication interface. The processing unit 520 is an integrated processor, a microprocessor, or an integrated circuit. The communication unit 510 may input data and output data, and the processing unit 520 may determine output data based on input data. For example, the communication unit 510 may input a paging message. Optionally, the processing unit 520 may determine output data, for example, a paging signal, based on input data. The communication unit 510 may output the paging signal.

For example, when the apparatus 500 is configured to perform the operations performed by the location server, the communication unit 510 is configured to receive an occupation status of each of one or more first SRS resources from one or more neighboring network devices in a positioning area; the processing unit 520 is configured to generate first information based on the occupation status of each of the one or more first SRS resources from the one or more neighboring network devices in the positioning area; and the communication unit 510 is further configured to send the first information to a serving network device. For the occupation status of each of the one or more first SRS resources and the first information, refer to the related description in the method embodiment shown in FIG. 2. Details are not described herein.

In a design, before receiving the occupation status of each of the one or more first SRS resources from the one or more neighboring network devices in the positioning area, the communication unit 510 is further configured to receive one or more second SRS resources from the serving network device. For the one or more second SRS resources, refer to the related description in the method embodiment shown in FIG. 2. Details are not described herein.

In a design, before receiving the occupation status of each of the one or more first SRS resources from the one or more neighboring network devices in the positioning area, the communication unit 510 is further configured to send a first request message to the one or more neighboring network devices in the positioning area. For the first request message, refer to the related description in the method embodiment shown in FIG. 2. Details are not described herein.

In a design, the communication unit 510 is further configured to: send positioning area information of the positioning area to the serving network device; and send the positioning area information of the positioning area to a terminal device. For the positioning area, refer to the related description in the method embodiment shown in FIG. 2. Details are not described herein.

When the apparatus is a chip apparatus or a circuit, the apparatus may include a communication unit 510 and a processing unit 520. The communication unit 510 may be an input/output circuit and/or a communication interface. The processing unit 520 is an integrated processor, a microprocessor, or an integrated circuit. The communication unit 510 may input data and output data, and the processing unit 520 may determine output data based on input data. For example, the communication unit 510 may input an occupation status of each of one or more first SRS resources from one or more neighboring network devices in a positioning area. Optionally, the processing unit 520 may determine output data, for example, first information, based on input data. The communication unit 510 may output the first information.

Figure 6:
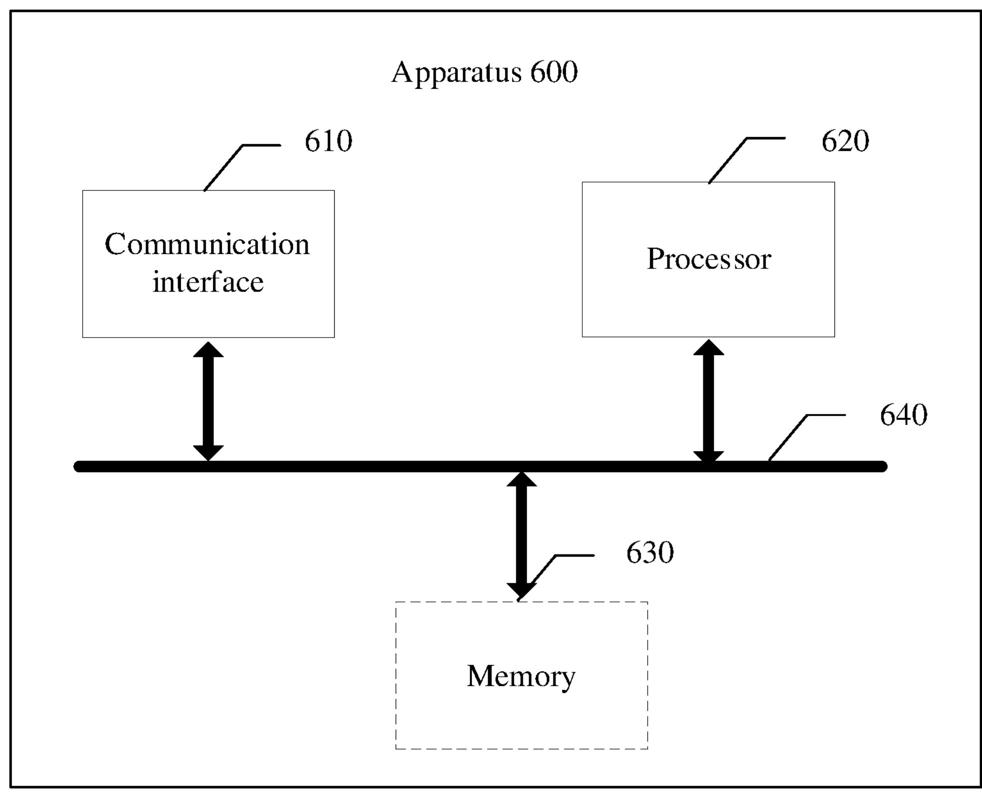
FIG. 6 is a schematic diagram of a communication apparatus according to an embodiment of this application.

FIG. 6 shows an apparatus 600 according to an embodiment of this application. The apparatus 600 is configured to implement a function on a side of a serving network device, a function on a side of the neighboring network device, and/or a function on a side of the location server in the foregoing method. When the apparatus is configured to implement the function on the side of the serving network device in the foregoing method, the apparatus may be a network device, a chip having a function similar to that of a network device, or an apparatus that can be used with a network device. When the apparatus is configured to implement a function of the neighboring network device in the foregoing method, the apparatus may be a network device, a chip having a function similar to that of a network device, or an apparatus that can be used with a network device. When the apparatus is configured to implement a function of the location server in the foregoing method, the apparatus may be a location server, a chip having a function similar to that of a location server, or an apparatus that can be used with a location server.

The apparatus 600 includes at least one processor 620, configured to implement the function on the side of the serving network device, the function on the side of the neighboring network device, and/or the function on the side of the location server in the method provided in embodiments of this application. The apparatus 600 may further include a communication interface 610. In this embodiment of this application, the communication interface may be a transceiver, a circuit, a bus, a module, or another type of communication interface, and is configured to communicate with another device through a transmission medium. For example, the communication interface 610 is used for an apparatus in the apparatus 600 to communicate with another device. The processor 620 may implement a function of the processing unit 520 shown in FIG. 5, and the communication interface 610 may implement a function of the communication unit 510 shown in FIG. 5.

The apparatus 600 may further include at least one memory 630, configured to store program instructions and/or data. The memory 630 is coupled to the processor 620. The coupling in this embodiment of this application may be an indirect coupling or a communication connection between apparatuses, units, or modules in an electrical form, a mechanical form, or another form, and is used for information exchange between the apparatuses, the units, or the modules. The processor 620 may cooperate with the memory 630. The processor 620 may execute the program instructions stored in the memory 630. At least one of the at least one memory may be included in the processor.

A specific connection medium among the communication interface 610, the processor 620, and the memory 630 is not limited in this embodiment of this application. In this embodiment of this application, the memory 630, the processor 620, and the communication interface 610 are connected by using a bus 640 in FIG. 6. The bus is represented by a bold line in FIG. 6. A manner of a connection between other components is merely an example for description, and imposes no limitation. The bus may be classified into an address bus, a data bus, a control bus, and the like. For ease of representation, only one bold line is used to represent the bus in FIG. 6, but this does not mean that there is only one bus or only one type of bus.

In another form of this embodiment, a computer-readable storage medium is provided. The computer-readable storage medium stores instructions. When the instructions are executed, the method on a side of the serving network device, a side of the neighboring network device, and/or a side of the location server in the foregoing method embodiments is performed.

In another form of this embodiment, a computer program product including instructions is provided. When the instructions are executed by an electronic apparatus (for example, a computer, a processor, or an apparatus in which a processor is installed), the electronic apparatus is enabled to perform the method on a side of the serving network device, a side of the neighboring network device, and/or a side of the location server in the foregoing method embodiments.

In another form of this embodiment, a communication system is provided. The system may include at least one of the foregoing network devices and at least one of the foregoing location servers. The at least one network device may be configured to perform a function on a side of the serving network device and/or a function on a side of the neighboring network device.

It should be understood that the processor in embodiments of the present invention may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory in embodiments of the present invention may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Based on descriptions used as an example instead of a limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, a memory (storage module) is integrated into the processor.

It should be noted that the memory described in this specification includes but is not limited to these memories and any memory of another proper type.

It should be understood that in various embodiments of this application, sequence numbers of the processes do not mean execution sequences. The execution sequences of the processes should be determined based on functions and internal logic of the processes, and should not be construed as any limitation on the implementation processes of embodiments of the present invention.

A person of ordinary skill in the art may be aware that the example units, algorithms, and steps described with reference to embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for convenient and brief description, for detailed working processes of the system, apparatus, and unit described above, refer to the corresponding processes in the foregoing method embodiments. Details are not described herein.

In the several embodiments provided in this application, it should be understood that the disclosed system, apparatus, and method may be implemented in other manners. For example, the described apparatus embodiment is merely an example. For example, division into the units is merely logical function division, and in actual implementation, another division manner may be used. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located at one location, or may be distributed on a plurality of network units. Some or all of the units may be selected based on actual requirements to achieve the objectives of the solutions in embodiments.

In addition, functional units in embodiments of this application may be integrated into one processing unit, each unit may exist alone physically, or two or more units may be integrated into one unit.

When the functions are implemented in a form of a software functional unit and sold or used as an independent product, the functions may be stored in a computer-readable storage medium. Based on such an understanding, the technical solutions in this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the operations in the methods described in embodiments of this application. The storage medium includes any medium that can store program code, for example, a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A paging method, comprising:

receiving, by a serving network device, positioning area information, wherein a positioning area represented by the positioning area information is used by a terminal device to send a sounding reference signal (SRS) in an inactive mode or an idle mode;

sending, by the serving network device, a paging message to one or more neighboring network devices in a paging area, wherein the paging area is determined based on the positioning area; and receiving, by the serving network device, first information from a location server, wherein the first information indicates an occupation status of each of one or more first SRS resources in each of a plurality of cells in the positioning area, the occupation status is "occupied", or the occupation status is "not occupied", and the first information is used to determine the paging area, wherein the paging area is a first cell set of the plurality of cells in the positioning area, a quantity of cells in which one or more second SRS resources are occupied in the plurality of cells comprised in the first cell set is less than or equal to a first threshold, and the one or more second SRS resources are a part or all of the one or more first SRS resources.

2. The method according to claim 1, wherein before the receiving, by the serving network device, the first information from the location server, the method further comprises:

sending, by the serving network device, the one or more first SRS resources to the location server, wherein the one or more first SRS resources are SRS resources to be configured by the serving network device for the terminal device, and the one or more first SRS resources are used to determine the first information.

3. The method according to claim 1, further comprising:

receiving, by the serving network device, one or more third SRS resources from one or more neighboring network devices located in the positioning area, wherein the one or more third SRS resources are not occupied, and the one or more third SRS resources are used to determine the paging area, wherein the paging area is a second cell set of the plurality of cells in the positioning area, a quantity of cells in which one or more fourth SRS resources are occupied in the plurality of cells comprised in the second cell set is less than or equal to a second threshold, and the one or more fourth SRS resources are a part or all of the one or more third SRS resources.

4. The method according to claim 3, wherein before the receiving, by the serving network device, the one or more third SRS resources from the one or more neighboring network devices located in the positioning area, the method further comprises:

sending, by the serving network device, one or more fifth SRS resources to the one or more neighboring network devices located in the positioning area, wherein the one or more fifth SRS resources are SRS resources to be configured by the serving network device for the terminal device, and the one or more third SRS resources are a part or all of the one or more fifth SRS resources.

5. The method according to claim 3, wherein before the receiving, by the serving network device, the one or more third SRS resources from the one or more neighboring network devices located in the positioning area, the method further comprises:

sending, by the serving network device, a first request message to the one or more neighboring network devices located in the positioning area, wherein the first request message is used to request an occupied SRS resource, and/or used to request an unoccupied SRS resource.

6. The method according to claim 1, further comprising:

sending, by the serving network device, a sixth SRS resource to one or more neighboring network devices located in the positioning area, wherein the sixth SRS resource is an SRS resource to be configured by the serving network device for the terminal device; and receiving, by the serving network device, a first message from the one or more neighboring network devices in the positioning area, wherein the first message indicates that the sixth SRS resource is occupied or not occupied, and the first message is used to determine the paging area, wherein the paging area is a third cell set of the plurality of cells in the positioning area, and a quantity of cells in which the sixth SRS resource is occupied in the plurality of cells comprised in the third cell set is less than or equal to a third threshold.

7. The method according to claim 1, wherein the paging area is the same as the positioning area, or the paging area is a part of the positioning area.

8. The method according to claim 1, wherein before the sending, by the serving network device, the paging message to the one or more neighboring network devices in the paging area, the method further comprises:

sending, by the serving network device, a second message to the terminal device, wherein the second message is used to release the terminal device to the inactive mode or the idle mode, and the second message comprises information about the paging area;

receiving, by the serving network device, information about the terminal device from a core network device, wherein the information about the terminal device from the core network device is used to trigger the serving network device to send the paging message to the one or more neighboring network devices in the paging area; and sending, by the serving network device, a paging signal.

9. An apparatus, comprising:

at least one processor;

a memory containing non-transitory computer instructions for a paging method, that when executed by the at least one processor cause the apparatus to perform the steps of:

receiving, by the apparatus, positioning area information, wherein a positioning area represented by the positioning area information is used by a terminal device to send a sounding reference signal (SRS) in an inactive mode or an idle mode;

sending, by the apparatus, a paging message to one or more neighboring network devices in a paging area, wherein the paging area is determined based on the positioning area; and receiving, by the apparatus, first information from a location server, wherein the first information indicates an occupation status of each of one or more first SRS resources in each of a plurality of cells in the positioning area, the occupation status is "occupied", or the occupation status is "not occupied", and the first information is used to determine the paging area, wherein the paging area is a first cell set of the plurality of cells in the positioning area, a quantity of cells in which one or more second SRS resources are occupied in the plurality of cells comprised in the first cell set is less than or equal to a first threshold, and the one or more second SRS resources are a part or all of the one or more first SRS resources.

10. The apparatus according to claim 9, wherein before the receiving, by the apparatus, the first information from the location server, the apparatus further performs the steps of:

sending, by the apparatus, the one or more first SRS resources to the location server, wherein the one or more first SRS resources are SRS resources to be configured by the apparatus for the terminal device, and the one or more first SRS resources are used to determine the first information.

11. The apparatus according to claim 9, wherein the apparatus further performs the steps comprising:

receiving, by the apparatus, one or more third SRS resources from one or more neighboring network devices located in the positioning area, wherein the one or more third SRS resources are not occupied, and the one or more third SRS resources are used to determine the paging area, wherein the paging area is a second cell set of the plurality of cells in the positioning area, a quantity of cells in which one or more fourth SRS resources are occupied in the plurality of cells comprised in the second cell set is less than or equal to a second threshold, and the one or more fourth SRS resources are a part or all of the one or more third SRS resources.

12. The apparatus according to claim 11, wherein before the receiving, by the apparatus, one or more third SRS resources from one or more neighboring network devices located in the positioning area, the apparatus further performs the steps comprising:

sending, by the apparatus, one or more fifth SRS resources to the one or more neighboring network devices located in the positioning area, wherein the one or more fifth SRS resources are SRS resources to be configured by the apparatus for the terminal device, and the one or more third SRS resources are a part or all of the one or more fifth SRS resources.

13. The apparatus according to claim 12, wherein before the receiving, by the apparatus, one or more third SRS resources from one or more neighboring network devices located in the positioning area, the apparatus further performs the steps comprising:

sending, by the apparatus, a first request message to the one or more neighboring network devices located in the positioning area, wherein the first request message is used to request an occupied SRS resource, and/or used to request an unoccupied SRS resource.

14. The apparatus according to claim 9, wherein the apparatus further performs the steps comprising:

sending, by the apparatus, a sixth SRS resource to one or more neighboring network devices located in the positioning area, wherein the sixth SRS resource is an SRS resource to be configured by the apparatus for the terminal device; and receiving, by the apparatus, a first message from the one or more neighboring network devices in the positioning area, wherein the first message indicates that the sixth SRS resource is occupied or not occupied, and the first message is used to determine the paging area, wherein the paging area is a third cell set of a plurality of cells in the positioning area, and a quantity of cells in which the sixth SRS resource is occupied in the plurality of cells comprised in the third cell set is less than or equal to a third threshold.

15. The apparatus according to claim 9, wherein the paging area is the same as the positioning area, or the paging area is a part of the positioning area.

16. The apparatus according to claim 9, wherein before the sending, by the apparatus, a paging message to one or more neighboring network devices in a paging area, the apparatus further performs the steps comprising:

sending, by the apparatus, a second message to the terminal device, wherein the second message is used to release the terminal device to the inactive mode or the idle mode, and the second message comprises information about the paging area;

receiving, by the apparatus, information about the terminal device from a core network device, wherein the information about the terminal device from the core network device is used to trigger the apparatus to send the paging message to the one or more neighboring network devices in the paging area; and sending, by the apparatus, a paging signal.

17. A non-transitory computer-readable medium (CRM) containing non-transitory computer instructions, that when executed by at least one processor of an apparatus, causes the apparatus to perform the steps comprising:

receiving, by the apparatus, positioning area information, wherein a positioning area represented by the positioning area information is used by a terminal device to send a sounding reference signal (SRS) in an inactive mode or an idle mode;

sending, by the apparatus, a paging message to one or more neighboring network devices in a paging area, wherein the paging area is determined based on the positioning area; and receiving, by the apparatus, first information from a location server, wherein the first information indicates an occupation status of each of one or more first SRS resources in each of a plurality of cells in the positioning area, the occupation status is "occupied", or the occupation status is "not occupied", and the first information is used to determine the paging area, wherein the paging area is a first cell set of the plurality of cells in the positioning area, a quantity of cells in which one or more second SRS resources are occupied in the plurality of cells comprised in the first cell set is less than or equal to a first threshold, and the one or more second SRS resources are a part or all of the one or more first SRS resources.

18. The CRM according to claim 17, wherein before the receiving, by the apparatus, the first information from the location server, the non-transitory computer instructions further cause the apparatus to perform the steps of:

sending, by the apparatus, the one or more first SRS resources to the location server, wherein the one or more first SRS resources are SRS resources to be configured by the apparatus for the terminal device, and the one or more first SRS resources are used to determine the first information.

19. The CRM according to claim 17, wherein the non-transitory computer instructions further cause the apparatus to perform the steps of:

receiving, by the apparatus, one or more third SRS resources from one or more neighboring network devices located in the positioning area, wherein the one or more third SRS resources are not occupied, and the one or more third SRS resources are used to determine the paging area, wherein the paging area is a second cell set of the plurality of cells in the positioning area, a quantity of cells in which one or more fourth SRS resources are occupied in the plurality of cells comprised in the second cell set is less than or equal to a second threshold, and the one or more fourth SRS resources are a part or all of the one or more third SRS resources.

20. The CRM according to claim 19, wherein before the receiving, by the apparatus, the one or more third SRS resources from the one or more neighboring network devices located in the positioning area, the non-transitory computer instructions further cause the apparatus to perform the steps of:

sending, by the apparatus, one or more fifth SRS resources to the one or more neighboring network devices located in the positioning area, wherein the one or more fifth SRS resources are SRS resources to be configured by the apparatus for the terminal device, and the one or more third SRS resources are a part or all of the one or more fifth SRS resources.

* * * * *